(12) United States Patent
Blume

(10) Patent No.: US 7,070,166 B1
(45) Date of Patent: Jul. 4, 2006

(54) POWDERED METAL INLAY

(76) Inventor: George H. Blume, 107 Morning Cloud Cove, Austin, TX (US) 78734

( * ) Notice: Subject to any disclaimer, the term of this patent is extended or adjusted under 35 U.S.C. 154(b) by 0 days.

(21) Appl. No.: 11/032,888

(22) Filed: Jan. 11, 2005

(51) Int. Cl.
*F16K 51/00* (2006.01)
(52) U.S. Cl. .................. 251/359; 251/368; 29/890.122
(58) Field of Classification Search ............... 251/359, 251/368; 29/890.122
See application file for complete search history.

(56) References Cited

U.S. PATENT DOCUMENTS

| | | | | |
|---|---|---|---|---|
| 2,163,472 A | * | 6/1939 | Shimer | 251/333 |
| 4,860,995 A | * | 8/1989 | Rogers | 251/356 |
| 5,088,521 A | * | 2/1992 | Johnson | 251/332 |
| 5,193,577 A | * | 3/1993 | de Koning | 251/332 |
| 5,226,445 A | * | 7/1993 | Surjaatmadja | 137/516.29 |
| 6,701,955 B1 | * | 3/2004 | McIntire et al. | 137/516.29 |

* cited by examiner

*Primary Examiner*—John Bastianelli
(74) *Attorney, Agent, or Firm*—Dennis W. Gilstad

(57) ABSTRACT

Methods and apparatus are disclosed for making substantially nonporous powdered metal (P/M) inlays on substrates using hot-isostatic-pressure (HIP). Methods described herein differ from conventional practice in their use of new apparatus for steps including: formation and maintenance of a P/M preform through use of an adjustable sliding element; application of increased pressure to a P/M preform via the adjustable sliding element; and evacuation of space around a P/M preform without the need to totally enclose a P/M preform and its substrate in a can. Certain embodiments provide for leak testing of welded seals prior to HIP, and other embodiments make the use of welded seals unnecessary.

24 Claims, 17 Drawing Sheets

POWDERED METAL INLAY

FIELD OF THE INVENTION

The present invention relates generally to powdered metal inlays on metal substrates and is applicable to valve seats suitable for rapid open-close cycling with abrasive fluids under high pressures. These valve seats are typically used in oil field mud pumps and other oil field well service pumps.

BACKGROUND

Valve terminology varies according to the industry (e.g., pipeline or oil field service) in which the valve is used. In some applications, the term "valve" means just the moving element, whereas in other applications, the term "valve" includes the moving element, the valve seat, and the housing that contains the moving element and the valve seat. A valve assembly of the present invention comprises a valve body (the moving element) and a corresponding valve seat, the valve body typically incorporating an elastomeric seal within a peripheral seal retention groove.

Valve assemblies of the present invention can be mounted in the fluid end of a high-pressure pump incorporating positive displacement pistons or plungers in multiple cylinders. Such a valve assembly may incorporate a web-seat, stem-guided valve design or a full open seat design, since either design can be adapted for high pressures and repetitive impact loading of the valve body and valve seat. These severe operating conditions have in the past often resulted in leakage and/or premature valve failure due to metal wear and fatigue. In overcoming such failure modes, special attention is focused in the present invention on valve sealing surfaces where the valve body contacts the valve seat intermittently for reversibly blocking fluid flow through a valve assembly.

Valve assembly sealing surfaces are subject to exceptionally harsh conditions in exploring and drilling for oil and gas, as well as in their production. For example, producers often must resort to "enhanced recovery" methods to insure that an oil well is producing at a rate that is profitable. And one of the most common methods of enhancing recovery from an oil well is known as fracturing. During fracturing, cracks are created in the rock of an oil bearing formation by application of high hydraulic pressure. Immediately following fracturing, a slurry comprising sand and/or other particulate material is pumped into the cracks under high pressure so they will remain propped open after hydraulic pressure is released from the well. With the cracks thus held open, the flow of oil through the rock formation toward the well is usually increased.

The industry term for particulate material in the slurry used to prop open the cracks created by fracturing is the propend. And in cases of very high pressures within a rock formation, the propend may comprise extremely small aluminum oxide spheres instead of sand. Aluminum oxide spheres may be preferred because their spherical shape gives them higher compressive strength than angular sand grains. Such high compressive strength is needed to withstand pressures tending to close cracks that were opened by fracturing. Unfortunately, both sand and aluminum oxide slurries are very abrasive, typically causing rapid wear of many component parts in the positive displacement plunger pumps through which they flow. Accelerated wear is particularly noticeable in plunger seals and in the suction (i.e., intake) and discharge valve assemblies of these pumps.

A valve assembly 10 (comprising a valve body 20 and valve seat 40) representative of a typical full open design valve and seat for a fracturing plunger pump is schematically illustrated in FIG. 1. FIG. 2 shows how sand and/or aluminum oxide spheres may become trapped between sealing surface 21 of valve body 20 and sealing surface 41 of valve seat 40 as the suction valve assembly 10 closes during the pump's pressure stroke.

The valve assembly 10 of FIG. 1 is shown in the open position. FIG. 2 shows how accelerated wear begins shortly after the valve starts to close due to back pressure. For valve assembly 10, back pressure tends to close the valve when downstream pressure exceeds upstream pressure. For example, when valve assembly 10 is used as a suction valve, back pressure is present on the valve during the pump plunger's pressure stroke (i.e., when internal pump pressure becomes higher than the pressure of the intake slurry stream. During each pressure stroke, when the intake slurry stream is thus blocked by a closed suction valve, internal pump pressure rises and slurry is discharged from the pump through a discharge valve. For a discharge valve, back pressure tending to close the valve arises whenever downstream pressure in the slurry stream (which remains relatively high) becomes greater than internal pump pressure (which is briefly reduced each time the pump plunger is withdrawn as more slurry is sucked into the pump through the open suction valve).

When back pressure begins to act on a valve, slurry particles become trapped in the narrow space that still separates the sealing metal surfaces of the valve body and seat. This trapping occurs because the valve is not fully closed, but the valve body's elastomeric seal has already formed an initial seal against the valve seat. The narrow space shown in FIG. 2 between metallic sealing surfaces 21 and 41 of the valve body and valve seat respectively is typically about 0.040 to about 0.080 inches wide; this width (being measured perpendicular to the sealing surfaces of the valve body and seat) is called the standoff distance. The size of the standoff distance is determined by the portion of the valve body's elastomeric seal that protrudes beyond the adjacent valve body sealing surfaces to initially contact, and form a seal against, the valve seat. As schematically illustrated in FIG. 2, establishment of this initial seal by an elastomeric member creates a circular recess or pocket that tends to trap particulate matter in the slurry flowing through the valve.

Formation of an initial seal at a valve that is closing under back pressure immediately stops slurry flow through the valve. Swiftly rising back pressure tends to drive slurry backwards through the now-sealed valve, but since backflow is blocked by the initial valve sealing, pressure builds rapidly on the entire valve body. This pressure acts on the area of the valve body circumscribed by its elastomeric seal to create a large force component tending to completely close the valve. For example, a 5-inch valve exposed to a back pressure of 15,000 pounds per square inch will experience a valve closure force that may exceed 200,000 pounds.

The large valve closure force almost instantaneously drives the affected valve assembly, whether suction or discharge, to the fully closed position where the metal sealing surface of the valve body contacts the corresponding metal sealing surface of the valve seat. As the valve body moves quickly through the standoff distance toward closure with the valve seat, the elastomeric seal insert is compressed, thus forming an even stronger seal around any slurry particles that may have been trapped between the seal insert and the valve seat.

Simultaneously, the large valve closure force acting through the standoff distance generates tremendous impact energy that is released against the slurry particles trapped between the metallic sealing surfaces of the valve body and the valve seat. As shown in FIG. 3, the slurry particles that are trapped between approaching valve sealing surfaces 21 and 41 are crushed.

In addition to the crushing action described above, slurry particles are also dragged between the valve sealing surfaces in a grinding motion. This grinding action occurs because valve bodies and seats are built with complementary tapers on the sealing surfaces to give the valve assembly a self-alignment feature as the valve body closes against the seat. As the large valve closing force pushes the valve body into closer contact with the seat, the valve body tends to slide down the sealing surface taper by a very small amount. Any crushed slurry particles previously trapped between the sealing surfaces are then ground against these surfaces, resulting in extreme abrasive action.

To limit sealing surface erosion due to this abrasion, valve bodies and seats have in the past been heat-treated to harden and strengthen them. Typical heat treatment methods have included carburizing, as well as hardening by induction heating and flame hardening. All of these hardening processes depend on quenching (i.e., rapid cooling) of the valve components after they have been uniformly heated, preferably slightly above a critical temperature (called the upper transformation temperature).

When a steel object is uniformly heated to a temperature slightly above its upper transformation temperature, all of the steel in the object assumes a face-centered cubic crystal lattice structure known as austenite. When the object is quenched below this temperature, other crystal lattice structures are possible. If quenched uniformly, the other crystal lattice structures tend to appear uniformly throughout the object. But if certain portions of the object are cooled at rates different from those applicable to other portions of the object, then the crystal lattice structure of the cooled object may be non-uniform.

Further, if steel is heated too far above its upper transformation temperature before quenching, its grain structure may be unnecessarily coarsened, meaning that the steel will then be less tough and more brittle after quenching than it would have been if its maximum temperature had been closer to its upper transformation temperature. It is therefore important that heat treatments for a particular steel be applied uniformly when uniform results are desired, and it is further important that maximum temperatures not be so high as to adversely affect the steel's grain structure.

Maximum heat-treatment temperatures for different steels vary because they are closely related to each steel's upper transformation temperature (which depends on that particular steel's composition). For example, carbon steel may have an upper transformation temperature as low as about 1333 degrees F., whereas high-alloy steels may have upper transformation temperatures of more than 2000 degrees F. The upper transformation temperature of the steel traditionally used in manufacturing high-pressure valve assemblies is about 1650 degrees F.

As an example of changes that can occur in a steel's crystal lattice structure at temperatures around its upper transformation temperature, consider a low-carbon steel. Such steels, commonly comprising iron and about 0.2% carbon with small amounts of alloying elements, are often used when carburizing is desired for hardening. As this steel begins cooling from a temperature slightly above its upper transformation temperature, its crystal lattice is 100% face-centered cubic (i.e., austenite), but as it cools the steel begins to assume other crystal lattice structures (typically referred to as martensite). Body-centered cubic forms are favored by relatively slow cooling, whereas body-centered tetragonal forms are favored by faster cooling. As cooling progresses, the percentage of austenite tends to decrease. And by the time the steel cools to a temperature of about 1333 degrees F. (called the lower transformation temperature), most of the austenite has been transformed to one or more other crystal lattice forms. Hence, at temperatures below about 1333 degrees F., little or no austenite exists and there are no further significant changes in the relative percentages of other crystal lattice forms present.

The above example of progressive changes in a low-carbon steel's crystal lattice differs considerably from the changes that would occur in higher alloy types of steel. Certain stainless steels, for example, can retain an austenitic lattice structure even at room temperature. In particular, the presence of nickel in steel alloys is observed to be associated with retention of austenitic lattice structure at temperatures below the lower transformation temperature.

The ability to predict the relative percentages of different crystal lattice forms present at different stages of a heat treatment allows adjustment of a wide variety of a steel's important physical properties to adapt it for specialized applications. An example of such an adaptation process comprises heating a steel to a predetermined temperature to within or slightly above a particular range (called the transfer temperature range) between the steel's upper transformation temperature and about 1333 degrees F. Following such heating, the steel is cooled (quenched) according to protocols developed to enhance physical properties such as hardness.

Quenching is performed primarily to influence the formation of a desirable crystal lattice and/or grain structure in a cooled metal, a grain being a portion of the metal having external boundaries and a regular internal lattice. Quenching may be accomplished, for example, simply by immersion of a heated metal object in water or oil. Certain tool steels may even be quenched by gas, but the carbon steels traditionally used for valve seats can not be gas-quenched if they are to develop the hardness, strength and toughness necessary for use in high-pressure valves.

Transitions between crystal structures that occur in association with quenching are not instantaneous, so the rate of cooling may be adjusted to favor development of more desirable crystal and/or grain structures with their corresponding beneficial material properties (e.g., tensile strength, hardness, ductility, toughness, etc.). Further, quenching may optionally be followed by tempering, wherein metal is reheated to a temperature below its lower transformation temperature before finally returning to room temperature. Tempering is particularly useful with relatively high-strength alloy steels because it makes the steel tougher and more ductile (as in tempered martensite) by reducing internal stresses that would otherwise tend to make steel brittle and prone to cracking (e.g., untempered martensite).

Heat treating of metals has been extensively studied, and many desirable properties may be obtained in metals through elaborate quench and temper protocols that have been experimentally developed. But preferred heat treatments are highly specific to particular alloys, so there may be no single optimal heat treatment for a component such as a valve seat comprising, for example, a high-alloy sealing surface inlay on a carbon steel substrate. Indeed, even the most careful use of heat treatments to favor development of hard sealing surfaces on strong, tough substrates has not proven effective for extending the service life of valves traditionally used for high-pressure abrasive slurries. Thus, engineers have long sought better methods of hardening valve sealing surfaces at acceptable cost.

For example, incorporation of metallic carbides in sealing surfaces has been investigated because some metallic carbides are extremely hard and wear-resistant. But such carbides do not bond well with the low-carbon steels commonly used in high pressure valve seats. Hence, when metallic carbide inlays are applied to such valve seat substrates, they must actually be held in place by some type of binder which itself forms an adequate bond with the valve seat substrate steel.

To facilitate mixing metallic carbides with binders, the carbides are made commercially available in powder form. Such powders (e.g., carbides of vanadium, molybdenum, tungsten or chromium) are formed by casting the pure carbides and then crushing them into the desired particle size. A binder (comprising, e.g., cobalt, chromium, and/or nickel) is then added to the crushed carbide powders, but there is little or no opportunity for the binder to alloy with the carbides.

Metallic carbide particles thus bound as an inlay on a steel substrate are called cemented carbides, and they comprise a matrix consisting of a dispersion of very hard carbide particles in the (relatively softer) binder. The resulting cemented carbide inlays are thus not homogeneous, so they do not possess the uniform hardness that would ideally be desired for good abrasion resistance and toughness in valve sealing surfaces. One problem associated with this inhomogeneity becomes evident because the crushing and grinding of slurry particles between valve sealing surfaces during valve closure produces a variety of slurry particle sizes, some so fine that they are smaller than the spacing between the carbide particles in the cemented carbide inlay. These fine slurry particles are very abrasive, and they can fit between the carbide particles to rapidly wear away the relatively soft binder holding the carbide particles in place. Thus loosened (but not actually worn down), the carbide particles can simply be carried away by the slurry stream, leaving the remainder of the inlay binder exposed to further damage by the abrasive slurry.

Notwithstanding the above problems, cemented carbides, particularly those applied by gas-fueled or electrically-heated welding equipment, have been widely used to reduce abrasion damage in various industrial applications. But weld-applied carbide inlays have not been found acceptable in high pressure valves. Rather, the repetitive high-impact loading common in such valves, combined with cemented carbide's brittle nature and tendency to crack, has tended to cause premature (often catastrophic) valve failures. Thus, a long-felt need remains for better technology that can be economically applied to harden valve sealing surfaces without imparting excessive brittleness or likelihood of fatigue cracking. Any such new technology should address the problems of carbide inhomogeneity noted above, as well as other problems (e.g., as discussed below) commonly associated with the welding technology used for carbide application.

Among the other welding-related problems seen in applications of cemented carbides to a steel substrate are those resulting from poor weld preparation and from relatively high amounts of carbides in the weld inlay. Additionally, the surface of a newly-applied carbide weld inlay is rather rough. But a valve seat requires a smooth finish to reduce friction and abrasion in contacts with the valve body and its elastomeric seal. A smooth finish also tends to prevent stress risers from developing on the wear surface, so most seats are machined with a 63 RMS (root mean square) surface finish. Unfortunately, traditional cemented carbides cannot be softened for machining by annealing so they must be ground to achieve a smooth surface. Grinding a valve seat surface, in turn, requires special and expensive tooling and fixturing, and the grinding itself is slow, labor-intensive and expensive.

Further problems related to weld-applied cemented carbides result from the large amounts of heat concentrated during welding on a relatively small area of steel (such as a valve mating surface inlay) which itself is adjacent to a larger mass of steel (such as a valve seat substrate). Portions of the substrate adjacent to the small heated volume of the inlay act as heat sinks, meaning that their temperature increases more slowly than the temperature of the heated (cemented carbide) inlay. Because of the temperature gradient thus created between the cemented carbide inlay and the steel substrate, and the generally different coefficients of expansion of these two materials, high shear stresses can develop between inlay and substrate during both heating and cooling. And unfortunately, a residual level of stress tends to persist after cooling and to be concentrated in both the base material and the cemented carbide inlay.

One reason that residual stresses persist after cooling of a weld-applied cemented carbide inlay on a larger steel substrate is that the rate of cooling of the liquid weld puddle is strongly influenced by the heat-sink effect of the relatively large mass of substrate, rather than being easily controllable through a quench and temper protocol which is applied to the mass as a whole. This heat-sink influence is termed the mass-quench effect, and it causes residual stresses that predispose weld-applied cemented carbide mating surfaces to premature cracking. While such cracks are tolerated in certain applications where the cracks do not significantly affect the performance of the part, the same can not be said of high pressure valve assemblies. On the contrary, cyclic fatigue associated with the repeated large impact loads experienced by these valves magnifies the deleterious effects of cracks and residual stresses. Premature catastrophic failures of valve bodies and/or seats are a frequent result.

Thus, surface cracks and internal stresses, combined with the inhomogeneity of the inlays noted above, constitute significant disadvantages of weld-applied cemented carbide inlays. And there is a further problem related to the mass-quench effect after welding. It is the appearance after cooling of two distinct thin layers of substrate steel just under the cemented carbide inlay. These two layers have undesirable properties and they arise because when an inlay is applied by welding, there are two heat-affected zones that result from the welding. The first heat-affected zone is a layer of steel immediately adjacent to the weld inlay. Steel in this first zone is heated above its transformation temperature by molten metal in the weld puddle, and as the weld puddle cools, steel of the first zone layer is quenched by the adjacent "semi-cool" substrate (i.e., the mass-quench effect). But the quench is partial and incomplete because of heat retained in the solidifying weld puddle. As a result, some grains of steel are never transformed from austenite to martensite, and the retained austenite in this layer is undesirable because of its brittleness. Equally detrimental is the fact that even the martensite that is formed in this layer is itself untempered and brittle. Fortunately, the brittleness of the steel in this first zone layer can be mitigated by a simple tempering heat treatment cycle, during which existing martensite is tempered, and simultaneously at least some of the retained austenite will be converted to tempered (i.e., less brittle) martensite. Any retained austenite, of course, will continue to contribute to brittleness in this first zone layer.

Adjacent to the first zone steel layer described above, a second heat-affected zone develops between the first layer and the remainder of the steel substrate. In this second zone layer the coolness of the adjacent substrate prevents steel from reaching its transformation temperature. Nevertheless, the heat transmitted through the first zone layer from the molten weld pool is sufficient to temper the steel in this second zone layer. Tempering increases the steel's ductility, but it also adversely affects strength, toughness, and other physical properties which are necessary for a valve seat to withstand the high impact loads characteristic of high-pressure pumps.

Unfortunately, the physical properties of tempered steel in the second zone layer can only be improved by a full body (i.e., both inlay and substrate) quench and temper heat treatment. As noted above, such an operation brings its own set of problems due to generally significant differences in the coefficients of thermal expansion of the steel substrate and the cemented carbide weld inlay.

Further, the preferred quench and temper protocols for the two portions also differ, and they can not be applied individually. Rather, the mass-quench effect dominates the cooling process and the result is that weld-applied cemented carbide inlays are not only inhomogeneous, but they are also unavoidably associated with undesirably high levels of residual internal stresses. These stresses aggravate the above noted tendency of such cemented carbide inlays to form cracks that can lead to premature catastrophic valve failures.

To address the problem of inhomogeneity in high-pressure valve seats, the combination of cemented carbide inlays on low-carbon steel substrates has been replaced experimentally with wear-resistant (relatively high-carbide) tool steel cladding on low carbon steel substrates. The tool steel cladding is commercially available as a powder in which all the elements have been mixed, melted and then gas atomized into spheres. High grades of these tool steel cladding powders are called P/M (for particle metallurgy) grades, and they generally cost at least 10 times per unit weight more than lower grade tool steels. Notwithstanding the high grade and high cost of the tool steel cladding however, these experimental valve seats have not been successful because the reheat treatment required to reduce the cladding's brittleness does not simultaneously cause development of the required strength and toughness in the low-carbon steel substrate.

The above-noted difficulty of reducing the brittleness of a relatively high carbide P/M inlay while simultaneously developing strength and toughness in a low-carbon steel substrate is addressed by substituting low grade tool steel (e.g., H13) for the low-carbon steel of the substrate. Residual internal stress is thereby reduced because a cladding matrix of high alloy P/M powder has a coefficient of thermal expansion which closely matches that of a low grade tool steel substrate. Such close matching of thermal expansion coefficients is not seen with inlays of either cemented carbide or tool steel on a low-carbon steel substrate. Further, during the melting and atomization of P/M alloys, the elements combine to form very fine carbides. Some of the carbon and other elements alloy with the iron to form very high alloy steel, and some of the carbides are then able to alloy with the steel. The combination of the high alloy steel and the very fine alloyed carbides give cladding comprising such P/M tool steel the effect of being of uniform hardness and homogeneity throughout.

For example, the high alloy P/M tool steel grades such as REX 121 (available from Crucible Materials) and Maxamet (available from Carpenter Steel) have coefficients of expansion very near the coefficient of expansion of a lower grade tool steel such as H13. Thus, a valve seat comprising an H13 substrate with an inlayed wear surface of REX 121 will develop very little residual stress when heat treated. The published composition of REX 121 metallic powder is 3.4% carbon, 4.0% chromium, 10.0% tungsten, 5.0% molybdenum, 9.5% vanadium, 9.0% cobalt, and the balance iron. The published composition of Maxamet metallic powder is 2.15% carbon, 4.75% chromium, 13.0% tungsten, 6.0% vanadium, 10.0% cobalt, and the balance iron. And the composition of H 13 is as follows: 0.4% Carbon, 0.35% Manganese, 1% Silicon, 5.2% Chromium, 1.3% Molybdenum, and 0.95% Vanadium; with the balance iron.

Note that the above P/M grades are heavy in carbide-forming alloys, as well as having elevated levels of carbon to form the carbides. Further, in addition to demonstrating uniform hardness, these substantially homogeneous tool steels have high strength and good toughness compared with cemented carbides. P/M grade tool steels are heat treatable and can be annealed to allow for easy machining before being rehardened and tempered.

The P/M grade tool steels also have very uniform and fine grain size, which eliminates segregation. Segregation is a common problem with older tool steels that reduces toughness and results in brittleness. Indeed, the presence of vanadium in conventional tool steels must be limited because vanadium tends to aggravate segregation. But vanadium carbide is particularly desirable for its high hardness and wear resistance, and new high alloy P/M grades have become available that form primary carbide levels (including vanadium carbide) exceeding 25% metal carbides by volume. Thus, the P/M grades of tool steels approach the hardness and wear resistance of cemented carbides while minimizing or eliminating many of the problems associated with cemented carbides.

A typical process of forming P/M grade tool steels comprises induction melting of a pre-alloyed tool steel composition, followed by gas atomization to produce a rapidly solidified spherical powder. This powder may then be applied to a base steel substrate by either weld overlay or, preferably, by hot isostatic pressure (HIP). Of course, the substrate could be eliminated if P/M powder were used to form an entire structure such as a valve seat by use of HIP (i.e., by HIPPING), but the cost of a valve seat comprising 100% of P/M grade tool steels would be prohibitive. And in spite of its high cost, such a valve seat would lack the toughness and strength otherwise obtainable if mild steel or a lower grade tool steel were used as a substrate.

HIP is a preferred method of applying a P/M grade inlay to a substrate because welding degrades some of the desirable properties of P/M tool steels. Even when welded ideally, the P/M grades will lose their fine microstructure in the weld fuse zone, where they melt during welding. Thus, P/M grades, when welded, do not achieve optimal toughness. Further, the melting that occurs during welding will decarburize some of the carbides, decreasing wear resistance. For these reasons, using welding to apply the high alloy P/M grades on heavy impact areas such as a valve seat will always present some risk of cracking in service. Rather, to make best use of high alloy P/M grades, they must be applied by HIP.

The HIP process avoids problems associated with welding because HIP is carried out at a temperature that is slightly lower than the melting temperature of the material being HIPPED. In fact, the ideal HIP temperature is the temperature at which the HIPPED material is only slightly plastic.

To economically produce a HIPPED valve seat with high alloy P/M tool steel grades, a suitable material such as H13 tool steel must be selected to serve as the seat substrate material. Traditional valve seat materials are not acceptable because of the high temperature required to harden the new high alloy P/M tool steel grades (i.e., about 1875° F. to 2200° F.). These temperatures are well above the austenitizing temperatures of traditional seat materials and can therefore lead to degraded grain structure in such substrate steels (which should only be hardened at a maximum of about 1750° F. to preserve desired grain structure). If a desired grain structure is destroyed by overheating, the affected steel reverts to a traditional cast grain structure with large coarse grains, causing loss of toughness and a tendency to crack under the cyclic fatigue impact loading typical of valve seats. Additionally, a structure comprising a tool steel substrate having a tool steel inlay can be quenched as a unit by inert gas in a vacuum furnace (thus preventing oxidation and/or decarburization of the tool steels). A substrate of traditional carbon steel, on the other hand, must be quenched in liquid (preferably oil) which would degrade a tool steel inlay.

But if a high alloy P/M tool steel grade were to be applied to a traditional steel substrate and hardened as necessary for tool steel, the steel base would not harden properly and would not develop the physical properties necessary to support the tool steel inlay under impact loading. Hence, a tool steel substrate such as H13 is preferable for the reasons given above.

Further, H13 is hardened at temperatures between 1600° F.–1925° F. These temperatures overlap with the hardening temperatures noted above for the new high alloy P/M tool steel grades. Thus an H13 seat, with a HIP-applied inlay of the new high alloy P/M tool steel grades can be hardened at 1900° F. and then tempered to obtain the ideal physical properties of both steels. This results in a seat with superior wear resistance on areas subject to high impact, as well as excellent strength and toughness in other areas of the seat. Areas that mate with the valve body's elastomeric seal and areas where the valve guide slides up and down during opening and closing of the valve also benefit from the improved wear resistance of the H13 substrate. These benefits are due in part to the fact that when an H13 substrate is hardened at 1900° F. it develops carbides throughout. Though such carbides are present at a much lower level than in the P/M grades of the inlay, they add substantially to the overall durability of the valve seat.

In current industry practice, HIP-applied inlays as described above require that the P/M powder be subjected to heat and pressure in a sealed enclosure (e.g., a metal can) which is evacuated to less than 0.1 torr (i.e., less than 0.1 mmHg). Empirical data show that this high vacuum is needed to reduce the inlay's porosity to achieve an inlay density of at least 99.7%. High density of the inlay is necessary to prevent formation of porous defects in the finished valve seat. Such porous defects, if present under cyclic fatigue impact loading, act as stress risers which lead to cracks, crack propagation, and catastrophic failure. Establishment of a high vacuum within the sealed HIP enclosure reduces these problems and also avoids undesirable oxidation of both the tool steel substrate and the P/M powder inlay during subsequent heat treatment.

In some pre-HIP applications, P/M powder may be preformed into a shape corresponding to the final inlay position on the substrate. This preforming is generally done independent of the substrate itself. Powder preforms are commonly made using a Cold Isostatic Pressure (CIP) process in which the powder is forged into a physical shape that, while porous (typically about 50% voids), is held intact at the inlay position by mechanical bonds among the powder particles. Typically, CIP is applied by placing the P/M powder in some type of deformable mold (e.g., rubber) having the desired shape and then pressurizing the mold. The pressurized deformable mold then collapses on the powder, compressing it under very high pressure (typically at least 30,000 psi.). Higher grade tool steel P/M powders generally require relatively high CIP pressures to achieve the necessary structural integrity for a powder preform to prepare it for subsequent application of HIP. This is because the greater hardness of these tool steel P/M powders makes the powder particles relatively resistant to the deformation required to achieve sufficiently strong mechanical bonds among the particles. After the preform is subjected to CIP, it is then assembled or mated with the corresponding substrate part inside a deformable metal can in preparation for the HIP process.

A metal can used for application of HIP may, if it provides complete sealing around a powder inlay and substrate, facilitates evacuation of the space adjacent to the inlay as described above. For example, the can used in current industry practice for the powder preform has welded seams and completely surrounds both inlay and substrate. A cross-section of such a typical welded can assembly with its enclosed valve seat substrate and inlay is shown in FIG. 4.

Note that a welded can assembly analogous to that of FIG. 4 usually has an evacuation tube. When present, such a tube allows evacuation of the can assembly after it is welded together (with the evacuation tube then being crimped/welded shut to maintain the vacuum within the can assembly). If a can assembly does not have an evacuation tube, this means that the can assembly itself must be welded together in a high-vacuum environment using a technique, such as electron beam welding, which is suitable for welding in a vacuum.

Since the can assembly in FIG. 4 does have an evacuation tube, it may be welded together using conventional techniques. The welded can assembly is tested for leaks with helium, after which the helium and any residual air are then evacuated via the evacuation tube. After evacuation, the evacuation tube is first crimped shut and then welded. The evacuated can assembly is then placed in a HIP furnace that is pressurized (typically with an inert gas) to a pressure of about 15,000 psi. Simultaneously, induction coils inside the HIP furnace heat the evacuated can assembly to a temperature just below the melting point of the parts, typically about 2200° F. for tool steels. The pressurized evacuated can assembly is held at this temperature for approximately four hours, after which the P/M tool steel powder has been solidified and forged into an inlay having a metallurgical bond (i.e., fused) with the tool steel valve seat substrate.

Note that the currently practices of various versions of the basic CIP process described above are all relatively expensive. High costs are associated with the molds and the tooling for the upper and lower portions of the can assembly, as well as the special handling required in welding, pressure testing, evacuating, crimping, and sealing can assemblies. In fact, the cost of preparing evacuated can assemblies as described above may substantially exceed the cost of applying HIP to these same assemblies.

SUMMARY OF THE INVENTION

The current invention includes methods and apparatus for making P/M inlays on substrates using a modification of the canning portion of a conventional HIP process ("modified canning"). The modified canning process described herein differs from conventional HIP canning in several respects, including formation and maintenance of a P/M preform through use of an adjustable sliding element, application of the increased pressure required for HIP to a P/M preform via the same sliding element, and avoidance of the need to totally enclose a P/M inlay preform on its substrate in a can. Certain embodiments facilitate leak testing the integrity of a welded seal by detecting shape change in a deformable element, and certain other embodiments make the use of welded seals in preparation for HIP unnecessary.

Apparatus for using modified canning according to the present invention to make a tempered P/M valve seat inlay may comprise, for example, a forged valve seat form comprising H13 tool steel, plus commercially available metallic powder (e.g., the P/M tool steel powders REX 121 or Maxamet) for the inlays. A suitable P/M metallic powder may comprise, for example, about 3.4% carbon, about 4.0% chromium, about 10.0% tungsten, about 5.0% molybdenum, about 9.5% vanadium, about 9.0% cobalt, and the balance iron. A suitable alternative P/M tool steel powder may comprise, for example, about 2.15% carbon, about 4.75% chromium, about 13.0% tungsten, about 6.0% vanadium, about 10.0% cobalt, and the balance iron.

A suitable valve seat form may comprise, for example, a circular wall around a cylindrical void, said circular wall being substantially symmetrical about a longitudinal axis and having a first end spaced apart from a second end, as well as an inner surface spaced apart from an outer surface. In this valve seat form embodiment, a circular depression in the circular wall first end extends between the circular wall inner and outer surfaces. The circular depression comprises cylindrical inner and outer depression walls that are spaced apart and are coaxial with the circular wall. The inner and outer depression walls extend from the circular wall first end toward the circular wall second end to a depression bottom surface. The depression bottom surface extends between the inner depression wall and the outer depression wall.

A valve seat form of the present invention may also comprise a transverse web that extends from the circular wall inner surface completely across the cylindrical void adjacent to the circular wall first end. If, for example, a valve seat form is forged, such a transverse web typically remains when the circular wall is formed, peripheral portions of the transverse web being integral with the circular wall inner surface adjacent to the circular wall first end. Such a transverse web, being formed simultaneously with the circular wall itself, would normally be removed by a punch process which is part of the forging operation. In certain embodiments of the present invention, however, the web is temporarily retained in the valve seat form to assist in establishing and maintaining a vacuum within the circular depression until completion of HIP. In this way, the web is made available for use in the invention at little or no additional manufacturing cost. And if, on the other hand, the web is not temporarily retained in a valve seat form of the present invention, a removable valve seal plug inserted slidingly and sealingly within the cylindrical void can assist in establishing and maintaining a vacuum within the circular depression until completion of HIP. Still other ways of establishing and maintaining the desired vacuum within the circular depression until completion of HIP are described below.

A valve seat assembly of the present invention may comprise, in addition to the above valve seat form, a circular ring sealingly movable longitudinally within the circular depression. The circular ring has an obverse face for redistributing and compressing metallic powder within the circular depression and a reverse face. When the circular ring is moved longitudinally within the circular depression to redistribute metallic powder and compress it against the depression bottom surface to make a P/M preform, the powder exerts a back pressure tending to move the ring away from the powder. To preserve the predetermined desired shape of the P/M preform, the ring must not be allowed significant movement away from the powder.

Thus, the back pressure against the ring must be resisted by, for example, applying a constant pressure on the ring tending to move the ring toward the P/M preform. But maintaining such a constant pressure on the ring complicates normal handling of certain embodiments of the invention. In such cases, an alternative way to resist ring movement due to the back pressure is by creating an interference fit between the ring and the circular depression. Still another way to preserve the desired predetermined P/M preform shape is to apply sufficient pressure to the ring to temporarily lock the metallic powder particles together in the desired shape (i.e., applying sufficient pressure to the metallic powder to form a "green" powder preform). The latter pressure is typically substantially higher than the pressure required to correctly position a ring having an interference fit within a depression for forming and maintaining a P/M preform. And the choice among the above alternatives for forming and maintaining a P/M preform will typically depend on equipment availability, production schedules, etc.

In the above valve seat assembly a vacuum of about 0.1 torr or better must be created in the enclosed space containing the P/M preform to ensure sufficiently high density in the valve seat inlay that is formed when the P/M preform is HIPPED. To make the enclosed space in which the vacuum will be created, the circular ring may, after being moved longitudinally in the circular depression toward the depression bottom surface to redistribute and compress the metallic powder, be hermetically sealable itself (as, for example, by electron beam welding in a vacuum chamber) to the circular wall first end. Alternatively, a hermetic seal may be formed over the circular ring and the transverse web by a deformable circular lid centerable within the peripheral circular rim. The deformable circular lid is peripherally hermetically sealable to the peripheral circular rim by, for example, electron beam welding in a vacuum chamber, and the lid extends over the circular depression and the transverse web. Note that in certain embodiments, the deformable circular lid and the circular ring may be separable, whereas in other embodiments they may form a single circular lid-ring structure.

As described above, various embodiments of a valve seat assembly of the present invention comprise an adjustable sliding element (i.e., a circular ring) usable for redistributing and compressing metallic powder within the circular depression. Redistribution of metallic powder to form, for example, a P/M preform is accomplished by contact of the circular ring's obverse face with the powder, the obverse face comprising a predetermined shape such as a conical surface (shown schematically as part of certain embodiments described herein). The circular ring is sealingly movable longitudinally within the circular depression to prevent escape of metallic powder around the ring.

As noted above, creation of an interference fit between the circular ring and the circular depression is one way to avoid a situation where the ring could "spring back" away from the P/M preform (e.g., due to back pressure exerted on the ring by compressed metallic powder). When "spring back" is thus avoided, the circular ring either maintains its position or moves consistently toward the depression bottom surface in response to predetermined elevated ambient pressure on the valve seat assembly and/or predetermined force exerted directly on the ring. Such an interference fit may be established between, for example, the internal diameter of the circular ring and the diameter of the cylindrical inner wall of the circular depression and/or the outer diameter of the ring and the diameter of the cylindrical outer wall of the circular depression.

When the "spring back" phenomenon noted above is avoided by creating an interference fit of the circular ring within the circular depression, normal handling will not degrade a P/M preform within a valve seat assembly of the present invention, even if force on the ring tending to compress the metallic powder is reduced to zero. Thus, creation of an interference fit between the circular ring and the circular depression facilitates normal handling and will often be practiced, although it is not required for all embodiments of the invention.

Maintenance of a predetermined position of the circular ring within the circular depression allows production of consistent P/M preform shapes at lower pressures than those required for making "green" metallic powder preforms. Even at the relatively low pressures, metallic powder flows in a fluid-like manner to accommodate the changing shape of the internal space between the circular ring obverse face and the depression bottom surface. Meanwhile, the ring's interference fit in the depression prevents unplanned ring movement that could result in deformation of the P/M preform.

As noted above, longitudinal movement of the circular ring within the circular depression to accomplish redistribution and compression of metallic powder within the depression may result from direct pressure on the ring's reverse face, as by increased ambient pressure or, in certain embodiments, by pressure exerted by a circular top cap or a cylindrical ring adjuster that is in contact with the ring's reverse face. Ring movement may also be achieved through pressure exerted on a deformable circular lid which, in turn, is in contact with (and can exert pressure on) the ring's reverse face. Thus, in certain embodiments, a top cap subassembly may be used (with or without a cylindrical ring adjuster) to facilitate maintenance of a vacuum within the depression (i.e., within the enclosed space that contains the P/M preform). Further description of the above structures, as well as methods of using them, is provided below.

DETAILED DESCRIPTION

Figure 5:
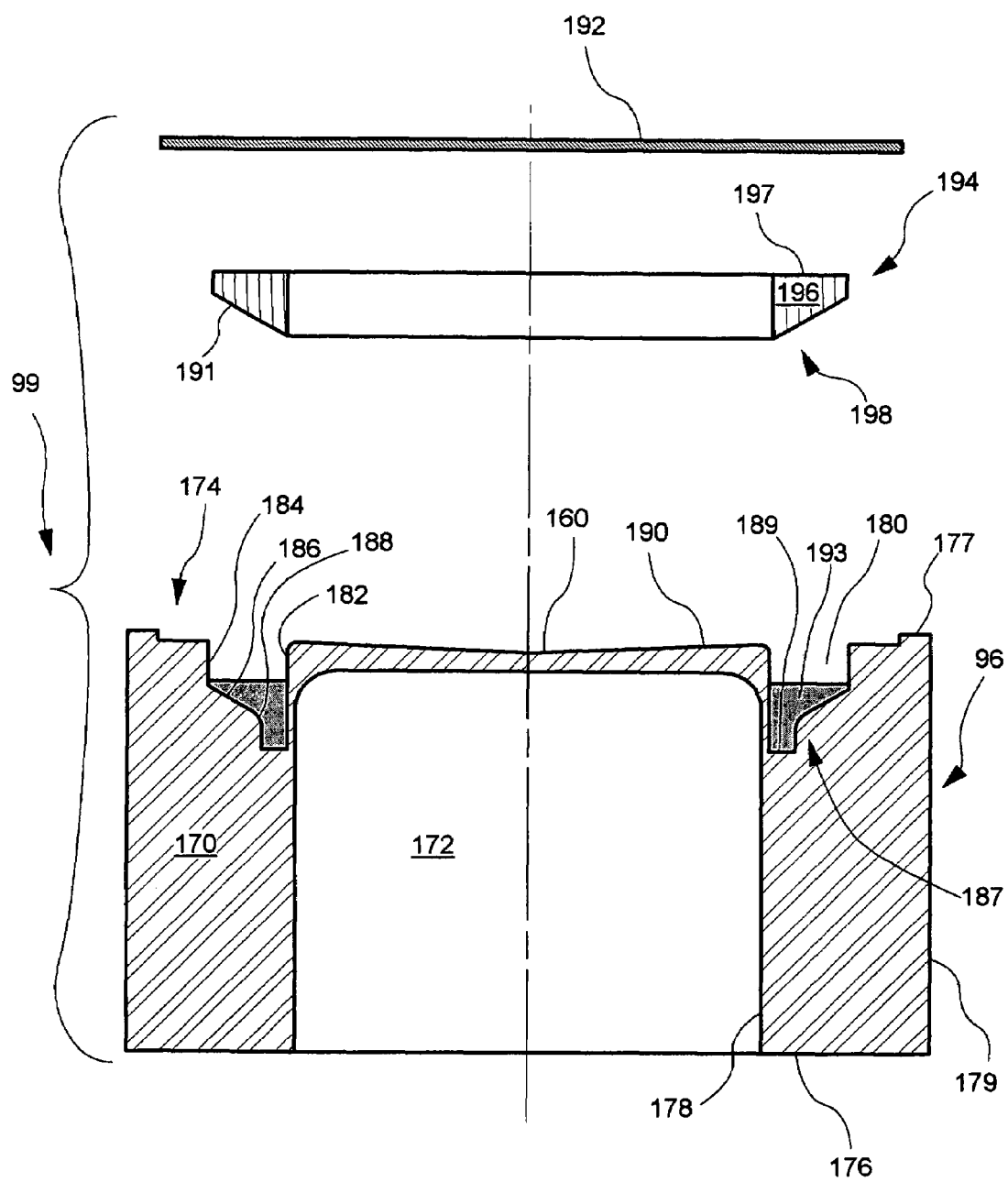
FIG. 5 schematically illustrates an exploded cross-sectional view of one embodiment of a valve seat assembly of the present invention, including a circular ring, a deformable circular lid, and a valve seat form comprising a circular wall having a peripheral circular rim, a circular depression, and a transverse web, metallic powder being located within the circular depression.

An exploded cross-sectional view of an example valve seat assembly 99 of the present invention is schematically illustrated in FIG. 5. A valve seat form 96 comprises circular wall 170 which surrounds cylindrical void 172. Circular wall 170 is substantially symmetrical about its longitudinal axis and has a first end 174 spaced apart from a second end 176, as well as an inner surface 178 spaced apart from an outer surface 179. In this illustrated embodiment, a circular depression 180 lies between circular wall inner surface 178 and circular wall outer surface 179. Circular depression 180 extends from first end 174 of circular wall 170 toward second end 176 to depression bottom surface 187. Circular depression 180 comprises cylindrical inner depression wall 182 and cylindrical outer depression wall 184. Both inner depression wall 182 and outer depression wall 184 are coaxial with circular wall 170. Depression bottom surface 187 extends between inner depression wall 182 and outer depression wall 184.

In valve seat form 96, a transverse web 190 extends from circular wall inner surface 178 completely across cylindrical void 172 adjacent to circular wall first end 174. In the illustrated embodiment of FIG. 5 valve seat form 96 has been forged, and transverse web 190 has been formed simultaneously with circular wall 170 as described above. Although it will subsequently be removed, transverse web 190 is temporarily retained in valve seat form 96 as shown in FIG. 5 to assist in maintaining a vacuum within circular depression 180 until completion of modified canning. In certain illustrated embodiments (see, e.g., FIGS. 5, 6A, 6B, and 7A), transverse web 190 comprises a shallow concavity 160 substantially symmetrical about the longitudinal axis and extending toward second end 176 of circular wall 170.

The illustrated embodiment of circular wall 170 in FIG. 5 additionally comprises a peripheral circular rim 177 on circular wall first end 174. Circular rim 177 is usable for centering and peripherally hermetically sealing deformable circular lid 192 to circular wall first end 174. As illustrated, deformable circular lid 192 extends over circular depression 180 and transverse web 190. Depression bottom surface 187 comprises at least one circular sloping surface 186 sloping generally from outer depression wall 184 inward (i.e., toward the longitudinal axis) and simultaneously toward circular wall second end 176. Depression bottom surface 187 additionally comprises circular flat surface 189 at a substantially constant depth within circular depression 180. Note that circular sloping surface 186 is a conical surface symmetrical about the longitudinal axis in the illustrated embodiment, sloping surface 186 being sloped at an angle of about 60 degrees with respect to the longitudinal axis. Further, circular depression bottom surface 187 additionally comprises a smoothly curved transition surface 188 between adjacent coaxial circular surfaces 186 and 189 of circular depression bottom surface 187.

Figure 6A:
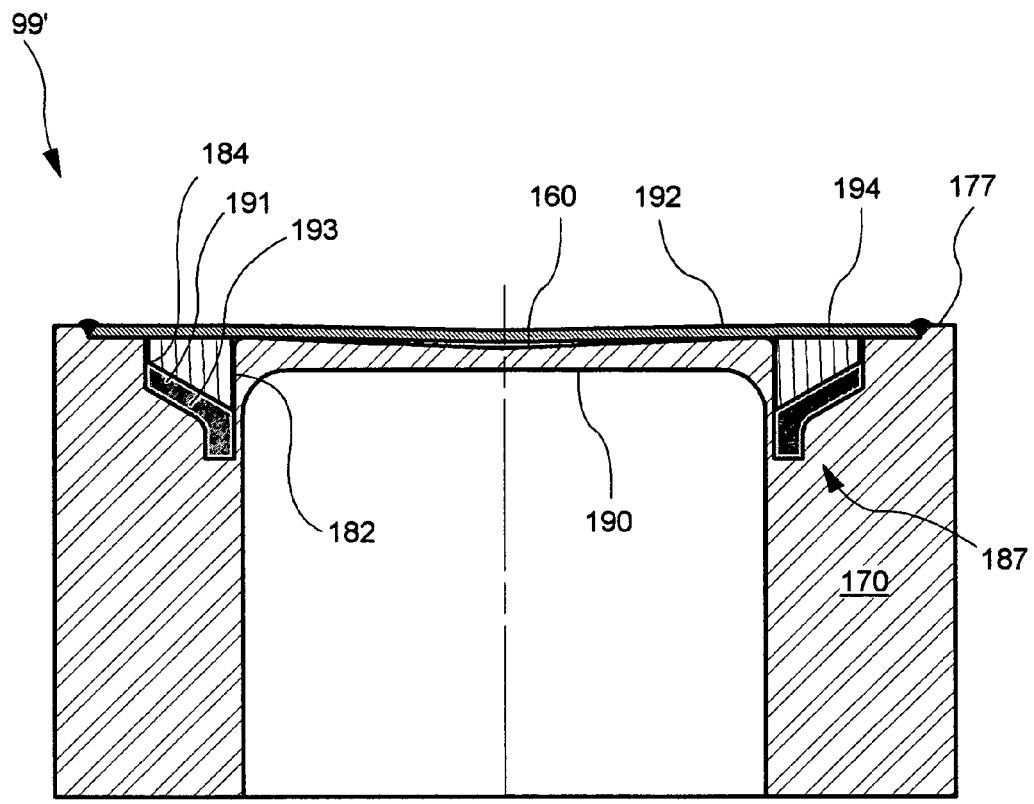
FIG. 6A schematically illustrates a cross-sectional view of a welded valve seat assembly, including a separable circular lid and circular ring on a valve seat form, after modified canning.
Figure 7A:
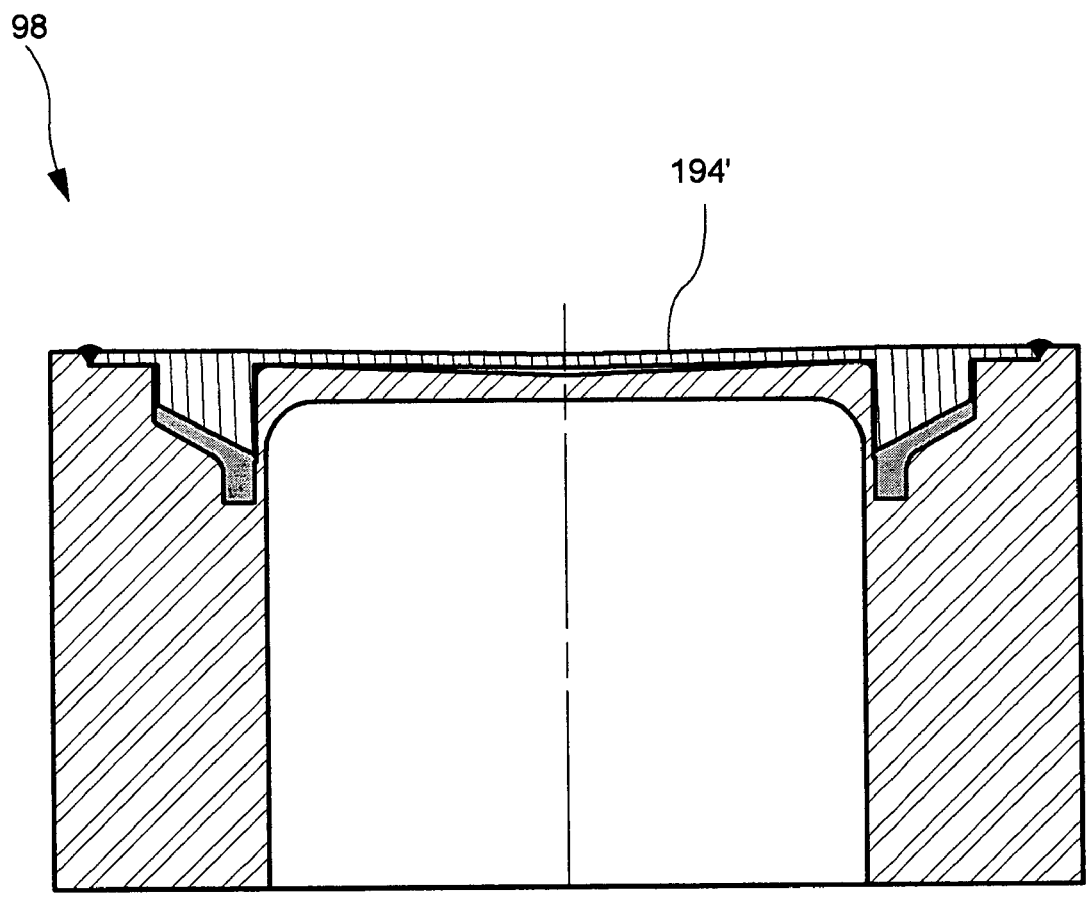
FIG. 7A schematically illustrates a cross-sectional view of a welded valve seat assembly, including an integral circular lid and circular ring on a valve seat form, after modified canning.

A metallic powder redistribution and compression element in the form of circular ring 194 is shown in FIG. 5 as being separable from deformable circular lid 192, but may in other embodiments be integral with the lid (see, e.g., FIG. 7A). Circular ring 194 is dimensioned to be closely fitted within and also sealingly movable longitudinally within circular depression 180. Circular ring 194 comprises an obverse face 198 (for redistributing and compressing metallic powder), a body 196, and a reverse face 197. Obverse face 198 in turn comprises a powder redistribution feature which, in the illustrated embodiment, is the conical surface 191. In the illustrated embodiment of FIG. 6A, the space between conical surface 191 and depression bottom surface 187 is shown as the space wherein metallic powder 193 (e.g., P/M tool steel powder as described above) is redistributed, compressed and retained in a desired predetermined P/M preform shape.

As noted above, circular ring 194 is dimensioned to be closely fitted within and also sealingly movable longitudinally within circular depression 180. Being sealingly movable in circular depression 180, circular ring 194 prevents the escape of metallic powder 193 which is redistributed and compressed between a powder redistribution feature of obverse face 198 and depression bottom surface 187. This sealing function of circular ring 194 may be achieved by a close sliding fit of circular ring 194 within circular depression 180 and/or by an interference fit of circular ring 194 within circular depression 180.

If such an interference fit is provided, the interference of circular ring 194 may be with inner depression wall 182 and/or with outer depression wall 184. If the interference is with either outer depression wall 184 or inner depression wall 182 (but not both), then the space within circular depression 180, including that which is bounded superiorly and inferiorly by obverse face 198 and depression bottom surface 187 respectively, may be evacuated (e.g., in preparation for HIP) even after circular ring 194 has been moved longitudinally within circular depression 180 to redistribute and compress metallic powder to form a P/M preform. Evacuation of circular depression 180, including the space containing the P/M preform and the interstitial spaces within the P/M preform itself, is possible through the close sliding clearance between circular ring 194 and either outer depression wall 184 or inner depression wall 182. After such evacuation, the space containing the P/M preform may be hermetically sealed by, for example, placing deformable lid 192 over circular depression 180 and then welding the periphery of deformable lid 192 to peripheral rim 177. Alternatively, circular ring 194 itself may be hermetically sealed within circular depression 180 by welding circular ring 194 to inner depression wall 182 and outer depression wall 184. Either of these options for achieving hermetic sealing of an evacuated space containing a P/M preform may be carried out in a vacuum chamber using, for example, electron beam welding. After such hermetic sealing, the resulting valve seat assembly may be HIPPED.

Note that if an interference fit is provided between circular ring 194 and both inner depression wall 182 and outer depression wall 184 of circular depression 180, then a hermetic sealing of space within circular depression 180 may be achieved without welding, simply by moving circular ring 194 longitudinally to insert it sealingly within circular depression 180. In this case, circular ring 194 must not be sealingly inserted within circular depression 180 until the space within circular depression 180 has been evacuated. Such evacuation may be accomplished by placing a valve seat assembly (comprising a circular wall having a circular depression containing metallic powder, together with a circular ring for insertion into the circular depression) within a vacuum chamber prior to insertion of the circular ring into the circular depression so as to achieve a hermetic seal and to redistribute and compress the powder. Alternatively a circular top cap, with associated components as shown in the illustrative examples herein, can be used to evacuate circular depression 180 prior to insertion of circular ring 194. With such use of a circular top cap and associated components, the space to be evacuated may be confined to little more than the space within circular depression 180 itself, rather than the generally much larger space within a vacuum chamber. Evacuation to an acceptable vacuum (e.g., about 0.1 torr) will proceed relatively quickly in the former case, with consequent savings of time and energy. But in either case, the hermetic seal which exists after circular ring 194 is inserted into circular depression 180 (and thus the vacuum necessary for successful HIP) will be maintained around the P/M preform during subsequent HIPPING of the valve seat assembly.

For valve seat assembly 99' schematically illustrated in FIG. 6A, an interference fit as described above between circular ring 194 and both inner depression wall 182 and outer depression wall 184 of circular depression 180 would typically be unnecessary. This is due to the hermetic seal provided by deformable circular lid 192 being welded to peripheral circular rim 177 of circular wall 170. Note that the powder redistribution feature (conical surface 191) of circular ring 194 has been advanced into contact with metallic powder 193 within circular depression 180, thus redistributing, compressing and retaining metallic powder 193 in a predetermined preform shape between conical surface 191 and depression bottom surface 187. Note also that deformable circular lid 192 was welded to peripheral circular rim 177 while the entire valve seat assembly 99' was in a vacuum chamber. Thus, after completion of this welding as illustrated in FIG. 6A, metallic powder 193 lies distributed, compressed and retained in a P/M preform shape in an evacuated space bounded superiorly and inferiorly by conical surface 191 and depression bottom surface 187 respectively.

Figure 1:
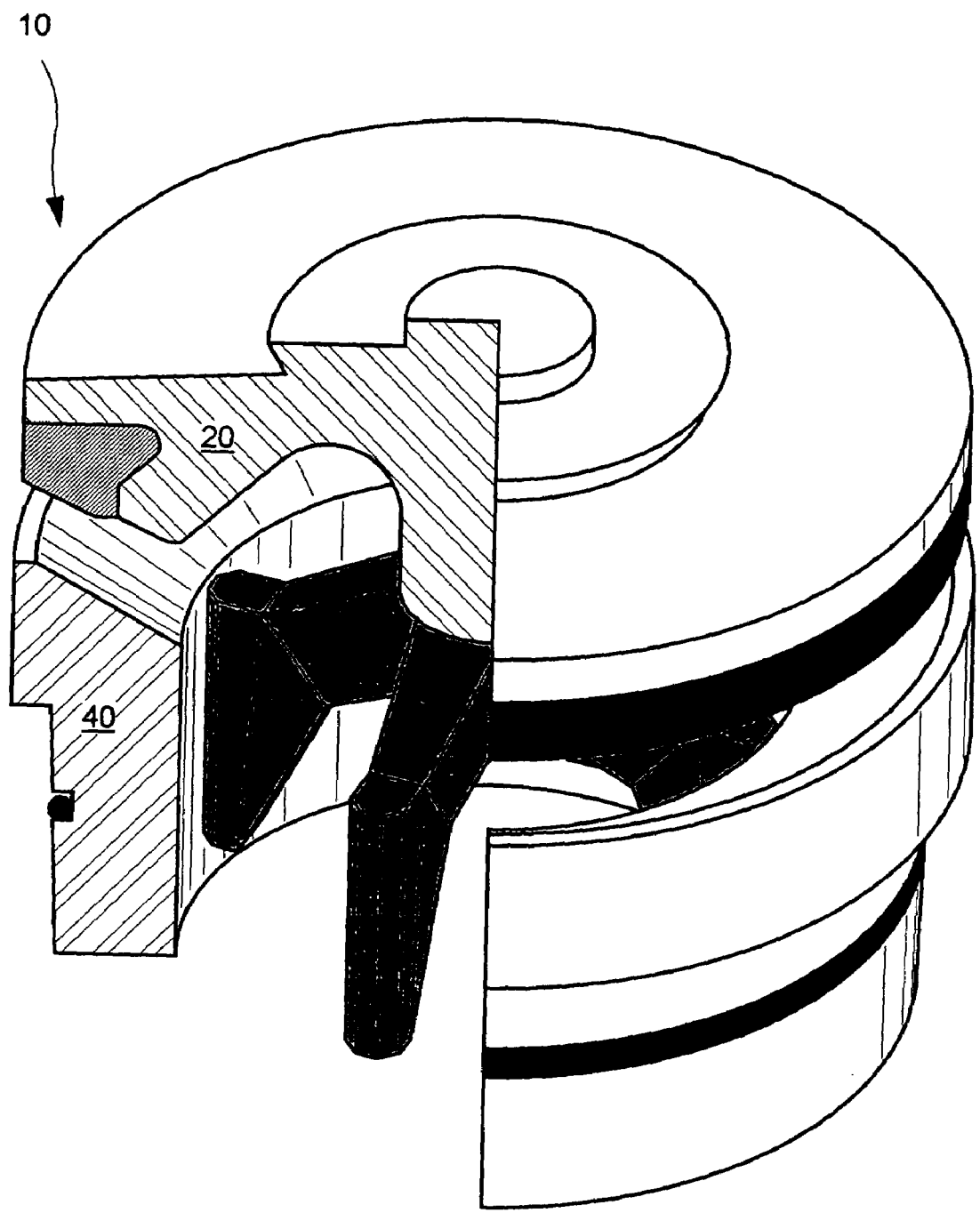
FIG. 1 schematically illustrates a typical valve body and seat assembly for fracturing pumps, the valve being in the open position.
Figure 2:
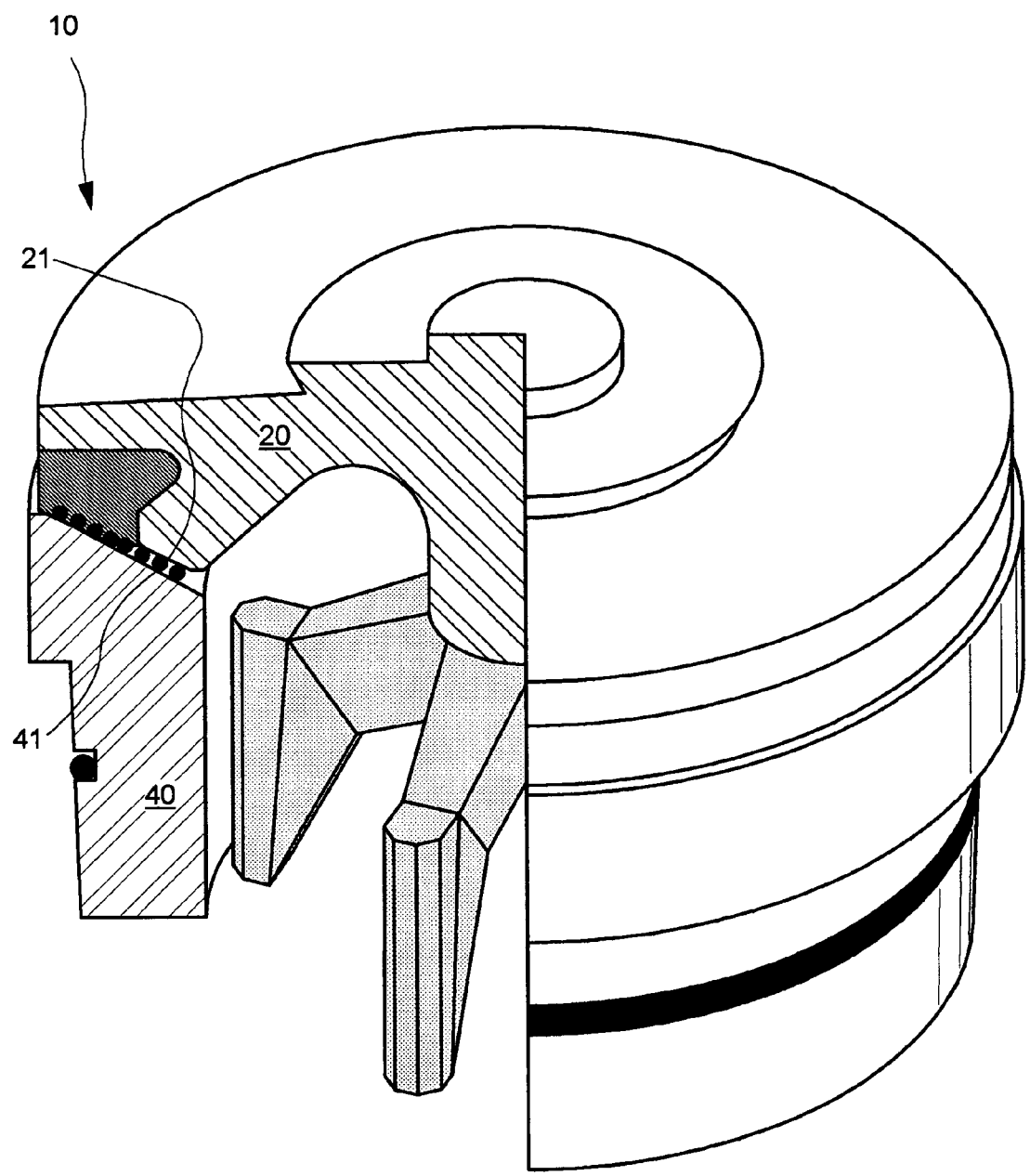
FIG. 2 schematically illustrates sand particles and/or aluminum oxide spheres trapped between mating surfaces during closure of the valve assembly in FIG. 1.
Figure 3:
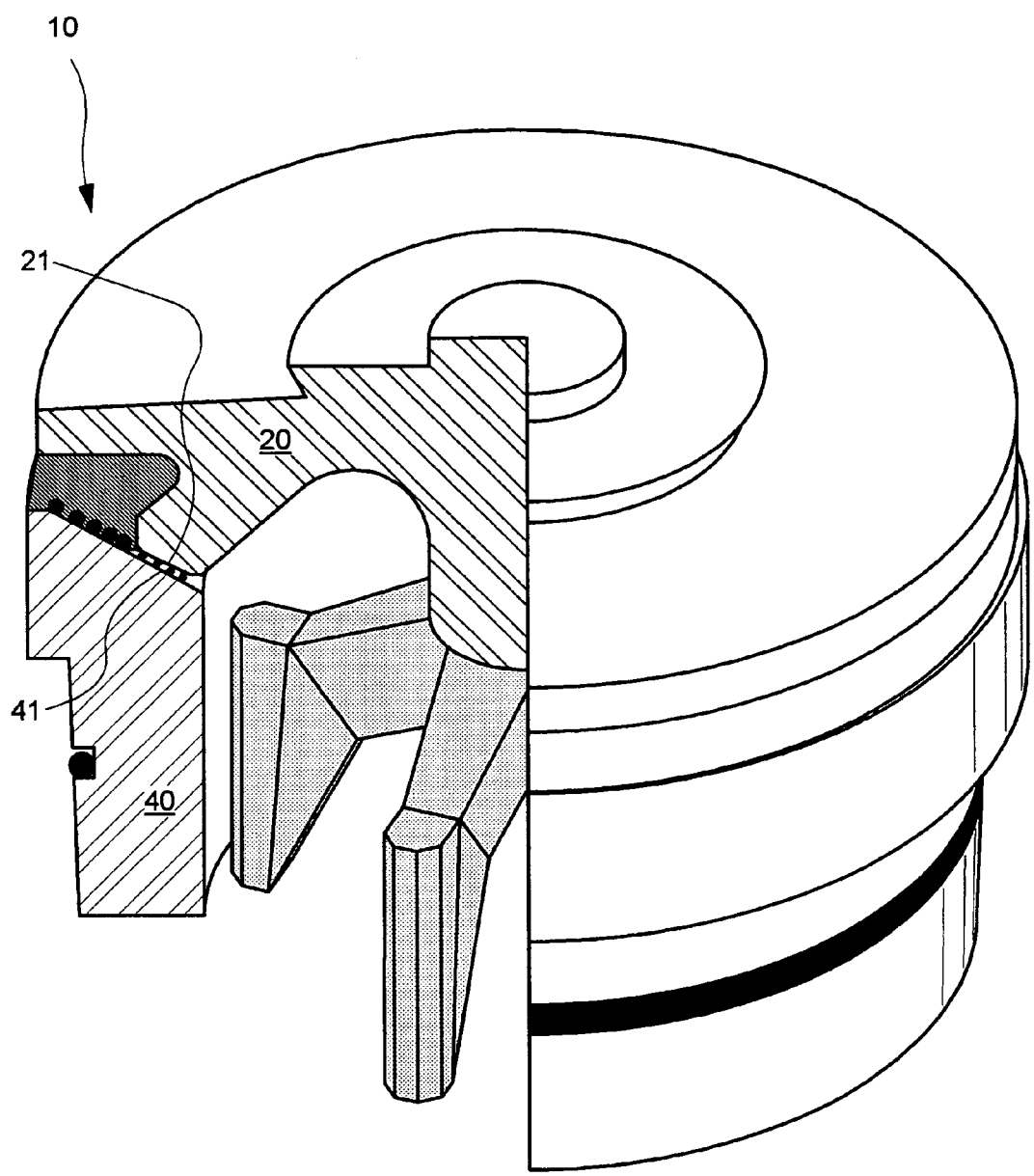
FIG. 3 schematically illustrates how the slurry particles that are not expelled from between the valve mating surfaces of FIGS. 1 and 2 are trapped and crushed upon completion of valve closure.
Figure 4:
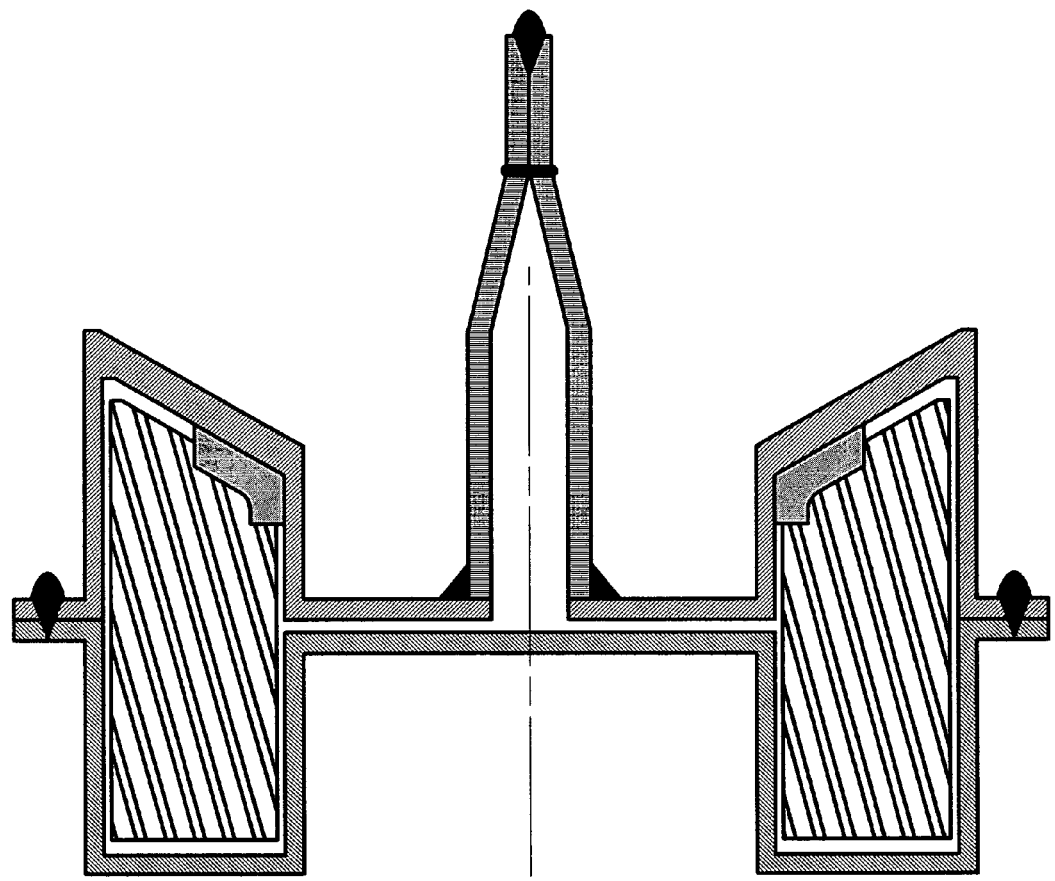
FIG. 4 schematically illustrates a cross-section of a typical conventional can assembly for HIPPING, wherein the valve seat substrate and P/M powder inlay preform are totally enclosed by the upper and lower portions of the can assembly.
Figure 8:
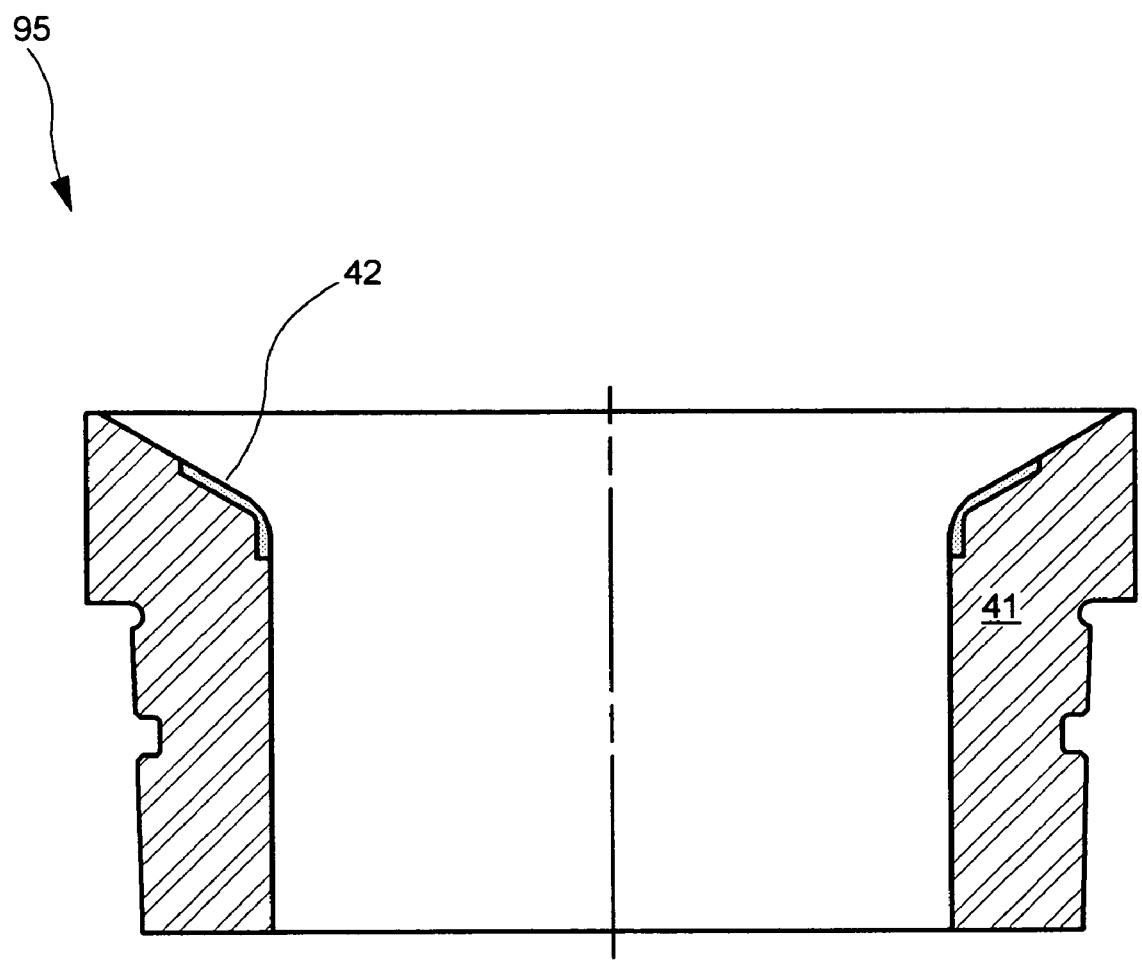
FIG. 8 schematically illustrates a cross-sectional view of a P/M inlay on a valve seat form after modified canning, HIP and finish machining.

To appreciate an advantage of the present invention, FIGS. 4 and 6A may be compared. Both drawings represent valve seat assemblies prior to HIP. And both assemblies produce analogous final parts (i.e., valve seats substantially as shown in FIG. 8). But a relatively large number of the assemblies in FIG. 6A can be compactly stacked like pancakes in a HIP furnace, whereas fewer of the assemblies in FIG. 4 could be stacked in the same HIP furnace. Thus the cost of HIPPING one of the assemblies in FIG. 6A will be significantly less than the cost of HIPPING one of the assemblies in FIG. 4. Additionally, the post-HIP machining costs for the assembly in FIG. 6A will be significantly less than the post-HIP machining costs for the assembly in FIG. 4.

Note in FIG. 6A that a shallow concavity exists in deformable circular lid 192 that generally matches shallow concavity 160 in transverse web 190. This lid concavity exists because deformable circular lid 192 was welded to peripheral circular rim 177 in a vacuum chamber. When welded assembly 99' is removed from the vacuum chamber in which circular lid 192 was welded to peripheral circular rim 177, ambient pressure surrounding welded assembly 99' (generally, atmospheric pressure) is higher than the near-zero pressure within the space between deformable circular lid 192 and transverse web 190. This pressure differential elastically deforms circular deformable lid 192 as shown. The deformation, in turn, serves as an inexpensive and reliable tattletale indicator during quality control inspection to insure that the weld that seals circular deformable lid 192 to peripheral circular rim 177 is air-tight (i.e., hermetic). If the tattletale concavity of circular deformable lid 192 is not present, or if it disappears over time, the weld seal is shown to be not air-tight, meaning assembly 99' must be disassembled, evacuated again, and re-welded.

Figure 6B:
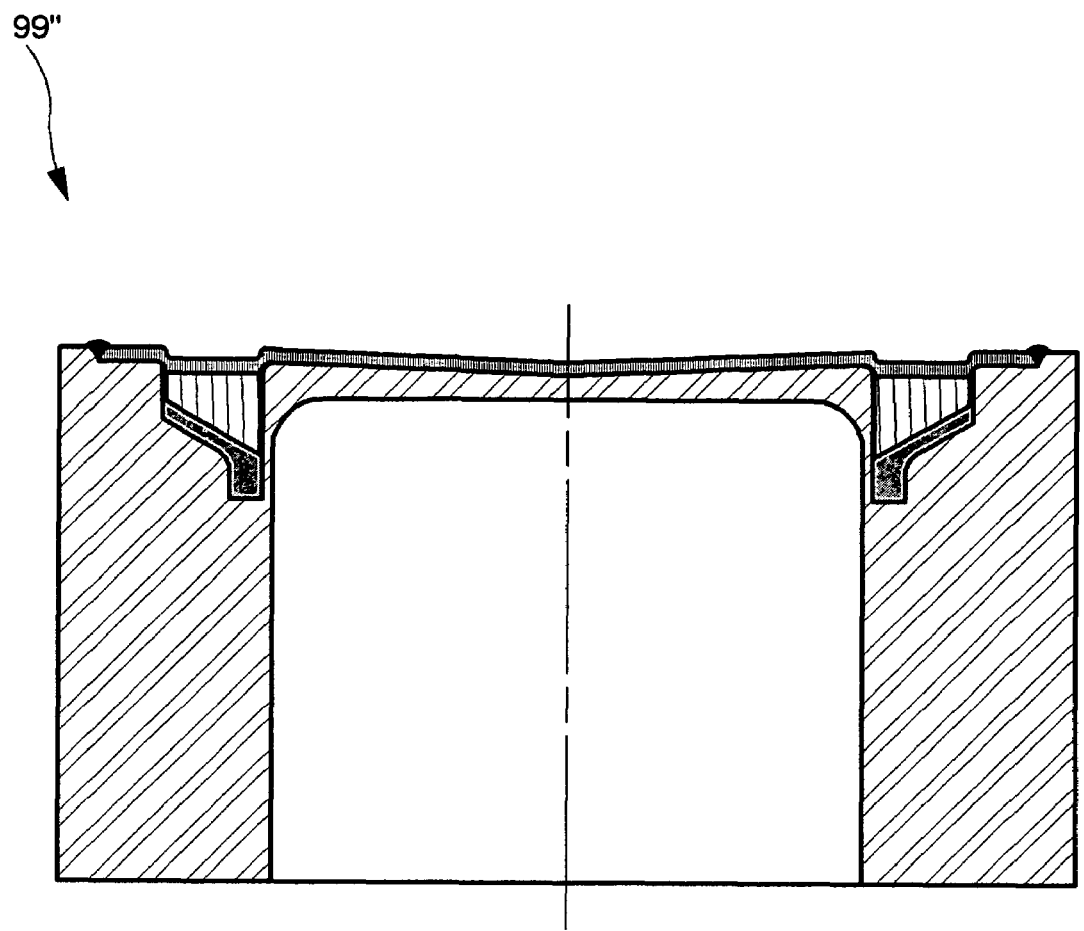
FIG. 6B schematically illustrates a cross-sectional view of the valve seat assembly shown in FIG. 6A after HIP.

As explained above, the space within circular depression 180 and between deformable circular lid 192 and transverse web 190 (that is, space within circular depression 180 and contiguous space), must be substantially evacuated (i.e., to about 0.1 torr) before completion of the weld that hermetically seals deformable circular lid 192 to peripheral circular rim 177. If the evacuation is not substantially complete within these spaces prior to HIP, the fused P/M powder will contain porosities. Any such porosity may constitute a stress riser under cyclic fatigue impact loading, leading to crack initiation and subsequent failure of the valve seat. Note in FIG. 6A (i.e., under the influence of ambient atmospheric pressure) there is still a small gap between deformable circular lid 192 and transverse web 190 of welded assembly 99'. But as schematically illustrated in FIG. 6B, welded assembly 99' has been structurally altered by application of the substantially higher-than-atmospheric pressure of HIP, the altered welded assembly being labeled 99". The gap seen in welded assembly 99' is not present in altered welded assembly 99" because deformable circular lid 192 and transverse web 190 have been fused together due to the high pressure of the HIP process.

Figure 7B:
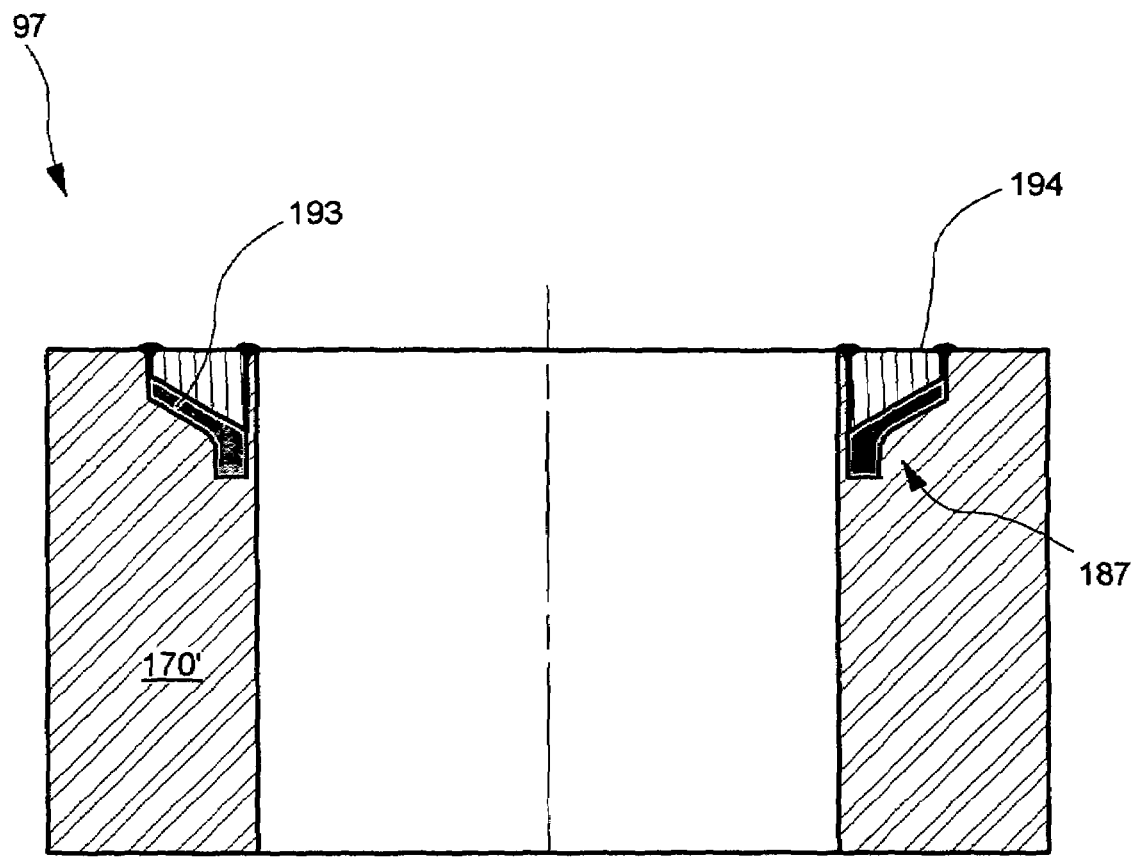
FIG. 7B schematically illustrates a cross-sectional view of a welded valve seat assembly, including a circular ring on a valve seat form, after modified canning.

Alternative valve seat assemblies of the present invention may comprise components differing from those illustrated in FIG. 5. For example deformable circular lid 192 may not be separable from circular ring 194, instead forming a circular lid-ring 194'. Such a valve seat assembly 98 is schematically illustrated in FIG. 7A. Still another alternative valve seat assembly 97 is schematically illustrated in FIG. 7B. Valve seat assembly 97 (FIG. 7B) does not have a deformable circular lid 192, and it comprises circular wall 170' which may be compared with circular wall 170 (FIG. 5) except for the absence of peripheral circular rim 177 and transverse web 190. As an alternative way of accomplishing the hermetic sealing function of circular lid 192 when it is welded to peripheral circular rim 177 (see, for example, FIG. 6A), circular ring 194 of valve seat assembly 97 is itself hermetically sealable (as, for example, by electron beam welding) under ambient vacuum to circular wall 170'. This direct hermetic sealing by welding of circular ring 194 to circular wall 170' obviates the need for circular lid 192, welded to circular rim 177 as in FIG. 6A, to act in concert with transverse web 190 to allow metallic powder 193 to be maintained in a vacuum.

Thus, metallic powder located between circular ring 194 and depression bottom surface 187, as shown in FIG. 7B, can be redistributed, compressed and retained under vacuum in a desired predetermined P/M preform shape via longitudinal adjustment of circular ring 194 within circular depression 180, followed by welding of circular ring 194 to circular wall 170' to form hermetic seals as illustrated in FIG. 7B. Note that if the fit of circular ring 194 within circular depression 180 is not an interference fit, continuous force may have to be applied to circular ring 194 both prior to and during welding of the illustrated seals to ensure that circular ring 194 does not spring back within circular depression 180 under the influence of back pressure exerted by compressed metallic powder. The need for such continuous force may be eliminated by compressing metallic powder within circular depression 180 by sufficient force on circular ring 194 to form the powder into a "green" powder preform which would exert little or no back pressure. Alternative ways to eliminate the need for such continuous force would be to create an interference fit between circular ring 194 and circular depression 180 as described above. The amount of interference in such an interference fit may be chosen to be sufficient to create resistance to longitudinal movement of circular ring 194 that will counteract the influence of back pressure exerted during compression of the metallic powder into a P/M preform.

After welding, the evacuated valve seat assembly 97 containing a P/M preform may then be subjected to HIP as described above. Note that during application of HIP to the welded evacuated valve seat assembly 97, the weld areas sealing circular ring 194 to circular wall 170' will deform as circular ring 194 is advanced further into circular depression 180 to increase the density of metallic powder 193 by greater compression against depression bottom surface 187.

Each of the valve seat assemblies disclosed above employs modified canning to provide an assembly ready for application of HIP which does not involve total enclosure of the assembly in a can. After application of HIP to any such assembly employing modified canning, the assembly is then annealed, finish machined, heat treated, hardened and tempered to make a tempered valve seat inlay 42. FIG. 8 schematically illustrates a valve seat 95 comprising a tempered valve seat inlay 42 on a valve seat substrate 41.

The present invention includes variations of the methods and apparatus described herein for obtaining tempered powdered metal inlays on substrates, the object shown in FIG. 8 being merely an illustrative example. Two such variations in the apparatus described above are schematically illustrated in the valve seat assemblies 94 and 93 of FIGS. 9A and 9B respectively. Note that the valve seat assemblies shown in FIGS. 5, 6A, 6B, 7A and 7B achieve the hermetic sealing of evacuated spaces containing P/M performs as required in the present invention by welding a circular deformable lid, circular ring or circular lid-ring to a valve seat form in a vacuum chamber. Because in each such case the entire assembly is within the vacuum chamber, the evacuation of space containing the metallic powder intended to form a valve seat inlay is substantially complete. Such an evacuation, in turn, substantially eliminates porosity in the fused P/M powder inlay obtained after HIP is applied.

Figure 9A:
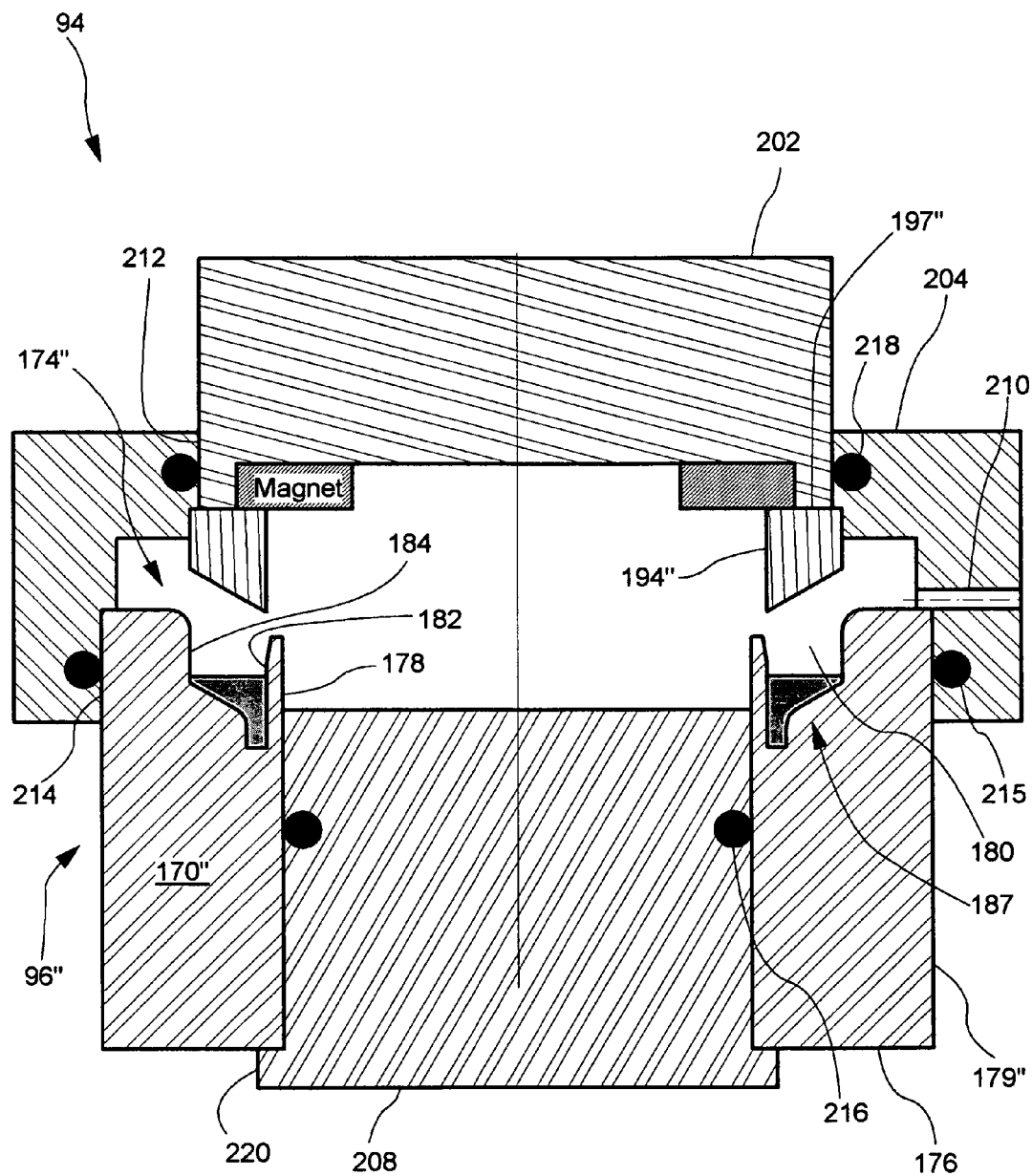
FIG. 9A schematically illustrates a cross-sectional view of an alternative valve seat assembly including a circular ring on a valve seat form with a valve seat plug under a circular top cap with magnetic ring restraint on a cylindrical ring adjuster.
Figure 9B:
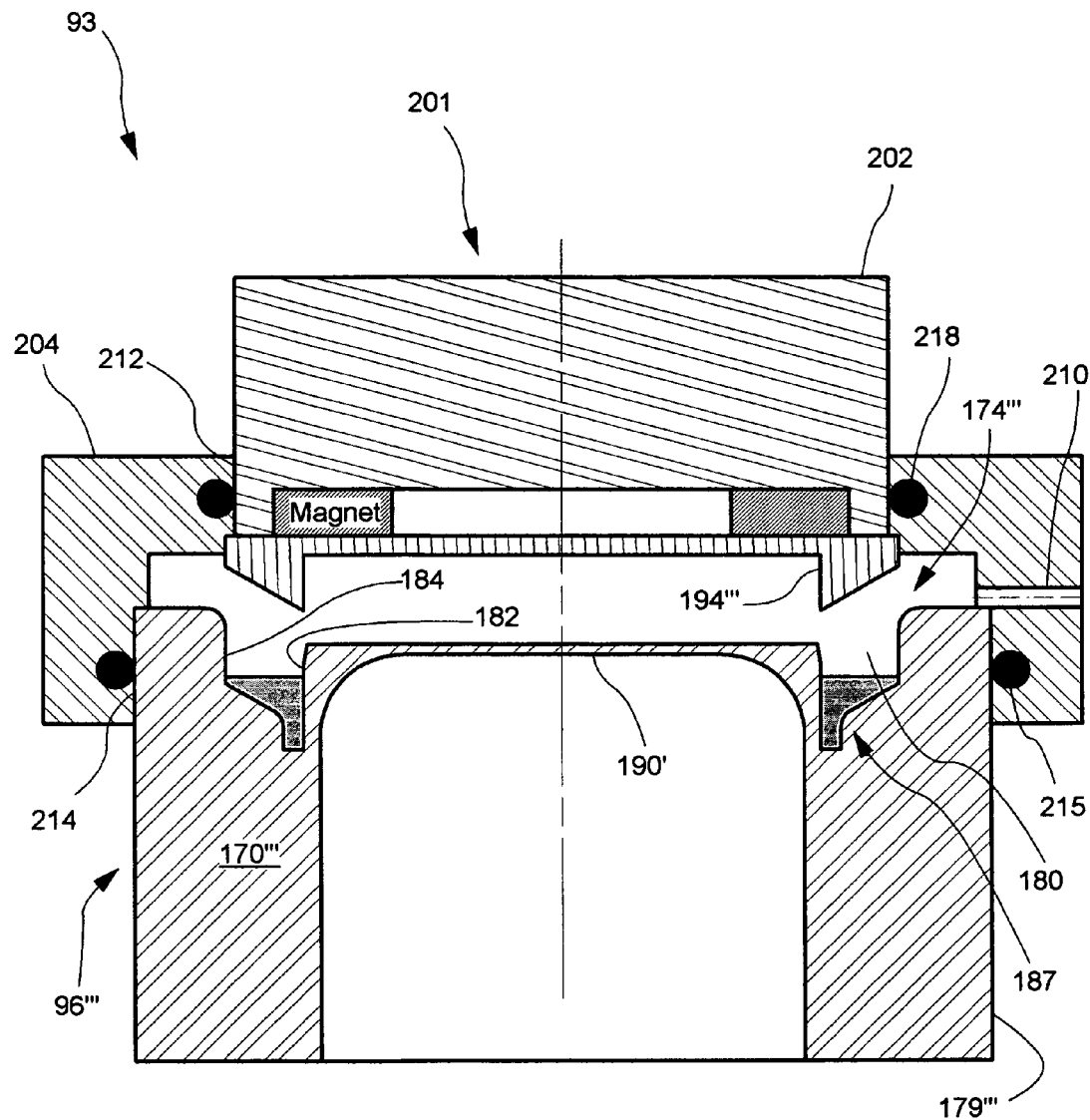
FIG. 9B schematically illustrates a cross-sectional view of an alternative valve seat assembly including a circular lid-ring on a valve seat form with a transverse web under a circular top with magnetic lid-ring restraint on a cylindrical ring adjuster.

In contrast, the purpose of assembly 94 in FIG. 9A and assembly 93 in FIG. 9B is in each case to eliminate the need for welding seals in a vacuum chamber. The hermetic sealing function of welded seals is replaced in each of these embodiments by an interference fit of a circular ring within a circular depression. In the embodiment of FIG. 9A, evacuation of the space within circular depression 180 is carried out via one or more evacuation/pressurization ports 210 in a removable (and reusable) circular top cap 204, in conjunction with a removable (and reusable) valve seat plug 208, and a removable (and reusable) cylindrical ring adjuster 202. In the embodiment of FIG. 9B, evacuation of the space within circular depression 180 is carried out via one or more evacuation/pressurization ports 210 in a removable (and reusable) circular top cap 204, in conjunction with a removable (and reusable) cylindrical ring adjuster 202 and a transverse web 190'. Note that circular wall 170" (FIG. 9A) and circular wall 170'" (FIG. 9B) comprise radiused and/or chamfered upper portions of inner depression wall 182 and outer depression wall 184 to facilitate entry of circular ring 194" (see FIG. 9A) or circular lid-ring 194'" (see FIG. 9B) into circular depression 180 notwithstanding their interference fit.

Referring to FIG. 9A, the hermetic sealing function of the welded seals of the valve seat assemblies shown in FIGS. 5, 6A, 6B, 7A and 7B is ultimately replaced by an interference fit between the inner diameter and the outer diameter of circular ring 194" with, respectively, inner depression wall 182 and outer depression wall 184 of circular depression 180 in circular wall 170". However, before circular ring 194" is advanced into circular depression 180 to achieve a hermetic seal, a vacuum must still be established around the powder within circular depression 180 to eliminate porosity in the final HIPPED inlay. This vacuum within circular depression 180 and contiguous space is achieved by withdrawing air through evacuation/pressurization port 210 from the interior space bounded by portions of circular top cap 204, cylindrical ring adjuster 202, valve seat plug 208 and circular wall 170". After the desired vacuum is achieved (i.e., about 0.1 torr), circular ring 194" may be advanced into circular depression 180 to redistribute and compress metallic powder within circular depression 180 as described above to form a P/M powder preform. Because of the hermetic seal then existing due to the interference fit of circular ring 194" with both the inner and outer walls of circular depression 180, circular top cap 204, cylindrical ring adjuster 202, and valve seat plug 208 may be removed prior to application of HIP. This removal may be facilitated by pressurizing (e.g., by compressed air admitted through evacuation/pressurization port 210) the interior space bounded by portions of circular top cap 204, cylindrical ring adjuster 202, valve seat plug 208, circular ring 194" and circular wall 170".

Note that valve seat plug 208 in FIG. 9A is removably inserted slidingly and sealingly within circular wall 170" from circular wall second end 176. Valve seat plug 208 comprises a flange 220 for contacting circular wall second end 176 to limit insertion of valve seat plug 208 into circular wall 170". Valve seat plug 208 also comprises at least one circumferential seal 216 for sealing valve seat plug 208 against circular wall inner surface 178 during sliding insertion of valve seat plug 208 within circular wall 170". In FIG. 9B, the sealing function of valve seat plug 208 is not required because valve seat form 96'" comprises transverse web 190'.

In FIG. 9A, circular top cap 204 fits slidingly and sealingly over circular wall first end 174". Analogously in FIG. 9B, circular top cap 204 fits slidingly and sealingly over circular wall first end 174'". In both FIGS. 9A and 9B, cylindrical ring adjuster 202 fits slidingly and sealingly within circular top cap 204. As seen in FIG. 9A, for example, the sliding seal of cylindrical ring adjuster 202 within circular top cap 204 allows cylindrical ring adjuster 202 to move longitudinally to contact circular ring reverse face 197" for moving circular ring 194" longitudinally within circular depression 180 toward depression bottom surface 187 for redistributing and compressing metallic powder within circular depression 180. But before circular ring 194" is moved sufficiently into circular depression 180 to hermetically seal the metallic-powder-containing portion of circular depression 180, substantially complete evacuation of this metallic-powder-containing portion and contiguous space must be accomplished.

To facilitate this evacuation in the embodiment of FIG. 9A, for example, circular top cap 204 comprises at least one evacuation/pressurization port 210 usable for evacuating circular depression 180 and contiguous space (i.e., space enclosed by portions of circular wall 170", circular top cap 204, cylindrical ring adjuster 202, and valve seat plug 208). Circular top cap 204 also comprises at least one internal circumferential seal 215 for sealing circular top cap 204 against circular wall outer surface 179" as circular top cap 204 is fitted slidingly over circular wall first end 174". Circular top cap 204 further comprises at least one internal circumferential seal 218 for sealing circular top cap 204 against cylindrical ring adjuster 202 as cylindrical ring adjuster 202 is fitted slidingly within circular top cap 204. Circumferential seals 215, 218 and 216, functioning with circular top cap 204, cylindrical ring adjuster 202, and valve seat plug 208 as described herein and shown in FIG. 9A, permit withdrawal of gas from circular depression 180 and contiguous space.

Analogously, before redistribution and compression of metallic powder in circular depression 180 in the embodiment of FIG. 9B, circular depression 180 and contiguous space must be evacuated. This evacuation is facilitated, as shown in FIG. 9B, by at least one evacuation/pressurization port 210 in circular top cap 204, port 210 being usable for evacuating circular depression 180 and contiguous space (i.e., interior space enclosed by portions of circular wall 170''', circular top cap 204, cylindrical ring adjuster 202, and transverse web 190'). Circular top cap 204 also comprises at least one internal circumferential seal 215 for sealing circular top cap 204 against circular wall outer surface 179''' as circular top cap 204 is fitted slidingly over circular wall first end 174'''. Circular top cap 204 further comprises at least one internal circumferential seal 218 for sealing circular top cap 204 against cylindrical ring adjuster 202 as cylindrical ring adjuster 202 is fitted slidingly within circular top cap 204. Circumferential seals 215 and 218, functioning with circular top cap 204, cylindrical ring adjuster 202, and transverse web 190' as described herein and shown in FIG. 9B, permit evacuation of circular depression 180 and contiguous space.

Structural relationships of the valve seat assembly embodiment of FIG. 9A include circular top cap 204 having first and second coaxial cylindrical inner surfaces 212 and 214 respectively spaced apart longitudinally, first cylindrical inner surface 212 (in conjunction with circumferential seal 218) fitting slidingly and sealingly over cylindrical ring adjuster 202, and second cylindrical inner surface 214 (in conjunction with circumferential seal 215) fitting slidingly and sealingly over circular wall outer surface 179'' of valve seat form 96''. Evacuation/pressurization port 210 extends radially through circular top cap 204 between first and second coaxial cylindrical inner surfaces 212 and 214 respectively.

The embodiment of FIG. 9A schematically illustrates an application of the present invention showing that once circular depression 180 and contiguous space of valve seat assembly 94 have been evacuated and circular ring 194'' has been advanced into circular depression 180 sufficiently to form a hermetic seal, circular ring 194'' may then be advanced further to redistribute and compress metallic powder within circular depression 180 (i.e., to form a P/M preform). Following this, circular top cap 204, cylindrical ring adjuster 202, and valve seat plug 208 may be removed as described above. The remainder of assembly 94 may then, due to its relatively small size, be packed efficiently in a HIP furnace. HIP pressure (typically about 15,000 psi) forces circular ring 194'' still further into circular depression 180, compressing the P/M powder preform while maintaining the necessary hermetic seal due to the interference fit of circular ring 194'' with both inner depression wall 182 and outer depression wall 184 of circular depression 180.

Note that during application of HIP, both pressure and temperature are substantially increased. In particular, HIP pressure rises sufficiently to force circular ring 194'' to move further into circular depression 180'' notwithstanding resistance to the movement offered by metallic powder within the depression and by the interference fit of the ring within the depression. As a result of this movement, the metallic powder is compressed to a substantially nonporous state and held in that state by HIP pressure as heat is applied. When the temperature of circular ring 194'' reaches the transformation temperature for the steel in the ring, stress associated with the interference fit of the ring within circular depression 180 is relieved and the steel of circular ring 194'' is subject to plastic deformation under the continuing HIP pressure. Note that circular ring 194'' typically comprises mild steel having a transformation temperature significantly lower than the transformation temperature of valve seat form 96''. Thus, even as circular ring 194'' deforms, there is no plastic deformation of any portion of circular depression 180 until compression of the metallic powder to a substantially non-porous state is complete. This is because valve seat form 96'' (which includes circular depression 180) comprises a tool steel (such as H13) having a significantly higher transformation temperature than the steel of circular ring 194''. This higher temperature is not reached in the HIP process until after compression of the metallic powder to a substantially nonporous state has been achieved. Thus the plastically deforming steel of circular ring 194'' behaves as a viscous fluid seal that transmits HIP pressure hydraulically (i.e., substantially equally) to portions of the inner and outer walls of circular depression 180 that it contacts, as well as to the metallic powder within circular depression 180. Since the metallic powder remains under substantially complete vacuum as it is compressed and heated to form an inlay through the above process, finished metal inlays made using the embodiment of FIG. 9A as above have the desired (i.e., substantially nonporous) character needed for exceptional durability in service.

Analogously, substantially nonporous metal inlays made using the embodiment of valve seat assembly 93 in FIG. 9B are also exceptionally durable. Valve seat assembly 93 comprises a valve seat form 96''' which resembles valve seat form 96 in FIG. 5 except for the absence of circular rim 177 and the presence of radiused and/or chamfered upper portions of inner depression wall 182 and outer depression wall 184 of circular depression 180. Because of the presence of transverse web 190' in valve seat assembly 93, circumferential seals 215 and 218 can function with circular top cap 204 and cylindrical ring adjuster 202 as described and shown above to facilitate evacuation of circular depression 180 and contiguous space. There is no separate deformable circular lid in FIG. 9B, but circular lid-ring 194''' is present as an integral structure. The hermetic sealing function described above for deformable circular lid 192 in valve seat assembly 99 is performed in valve seat assembly 93 by an interference fit between the outer diameter of circular lid-ring 194''' and outer depression wall 184 of circular depression 180 in circular wall 170'''.

In the embodiment of the present invention schematically illustrated in FIG. 9B, a vacuum (e.g., about 0.1 torr) must be established around metallic powder within circular depression 180 before circular lid-ring 194''' is advanced by cylindrical ring adjuster 202 into circular depression 180 to achieve a hermetic seal. This vacuum is achieved by withdrawal of air through evacuation/pressurization port 210 from circular depression 180 and contiguous space. Thus, interior space bounded by portions of top cap subassembly 201 (which comprises circular top cap 204 and cylindrical ring adjuster 202), plus portions of transverse web 190' and valve seat form 96''' is evacuated. After the desired level of vacuum is achieved (e.g., about 0,1 torr), circular lid-ring 194''' may be advanced into circular depression 180 to redistribute and compress metallic powder within circular depression 180 as described above to form a P/M preform. Because of the hermetic seal then existing due to the interference fit of circular lid-ring 194''' with outer depression wall 184 of circular depression 180, circular top cap 204 and cylindrical ring adjuster 202 may be removed prior to application of HIP. This removal may be facilitated by pressurizing (e.g., by compressed air admitted through evacuation/pressurization port 210) the space bounded by portions of circular top cap 204, cylindrical ring adjuster 202, circular lid-ring 194''', and valve seat form 96'''.

As in FIG. 9A, circular top cap 204 of valve seat assembly 93 in FIG. 9B has first and second coaxial cylindrical inner surfaces (respectively 212 and 214), with their respective circumferential seals 218 and 215 spaced apart longitudinally. First cylindrical inner surface 212 fits slidingly and sealingly over cylindrical ring adjuster 202, and second cylindrical inner surface 214 fits slidingly and sealingly over circular wall outer surface 179''' of circular wall 170'''. Cylindrical ring adjuster 202 functions with at least one peripheral sealing element 218 of top cap 204 to prevent gas passage through the center portion of circular top cap 204. Evacuation/pressurization port 210 extends radially through circular top cap 204 between top cap first and second coaxial cylindrical inner surfaces 212 and 214.

Figure 10:
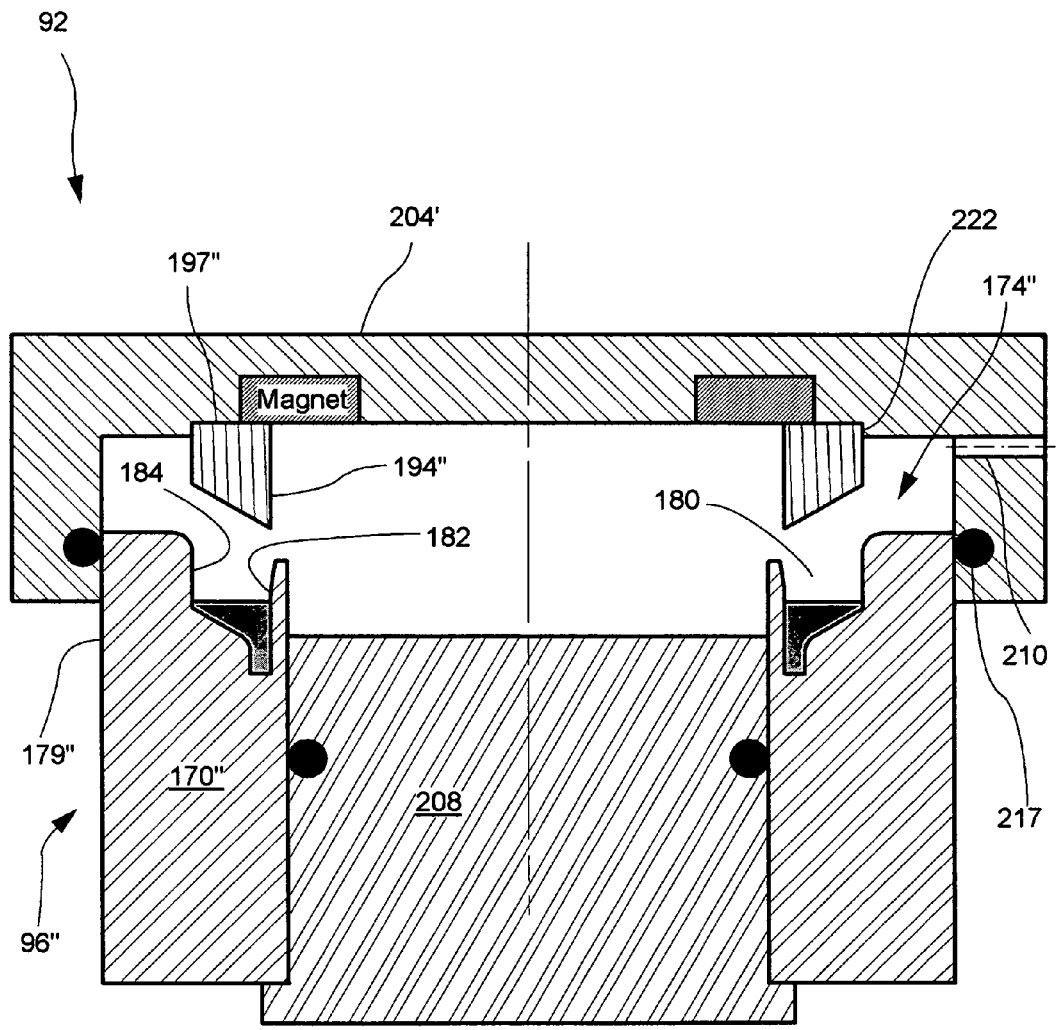
FIG. 10 schematically illustrates a cross-sectional view of an alternative valve seat assembly including a circular lid-ring on a valve seat form with a transverse web under a circular top cap with magnetic ring restraint.

Still another embodiment of the present invention is schematically illustrated as valve seat assembly 92 in FIG. 10. The hermetic sealing function which permits evacuation of circular depression 180 and contiguous space in valve seat assembly 92 is achieved by an interference fit between both the inner diameter and the outer diameter of circular ring 194" with inner depression wall 182 and outer depression wall 184 respectively. However, before circular ring 194" is advanced far enough into circular depression 180 to achieve a hermetic seal, a vacuum must be established around the powder within circular depression 180. This vacuum is achieved by evacuating, through evacuation/pressurization port 210, the space bounded by portions of circular top cap 204', valve seat plug 208 and valve seat form 96". After the desired level of vacuum is achieved (i.e., less than 0.1 torr), circular ring 194" may be advanced into circular depression 180 by pressure exerted on reverse face 197" of circular ring 194" by circular top cap 204'. This advancement of circular ring 194" redistributes and compresses metallic powder within circular depression 180 as described above to form a P/M preform. Because of the hermetic seal then existing due to the interference fit of circular ring 194" with both inner depression wall 182 and outer depression wall 184 of circular depression 180, circular top cap 204' and valve seat plug 208 may be removed after such ring adjustment and prior to application of HIP. Removal of circular top cap 204' and valve seat plug 208 may be facilitated by pressurizing (e.g., by compressed air admitted through evacuation/pressurization port 210) the space bounded by portions of circular top cap 204', valve seat plug 208, circular ring 194" and valve seat form 96". Note that circular top cap 204' in FIG. 10 extends across the entire first end 174" of circular wall 170" and contains at least one peripheral seal 217 to facilitate sliding and sealing movement over outer surface 179" of circular wall 170'''.

Figure 11:
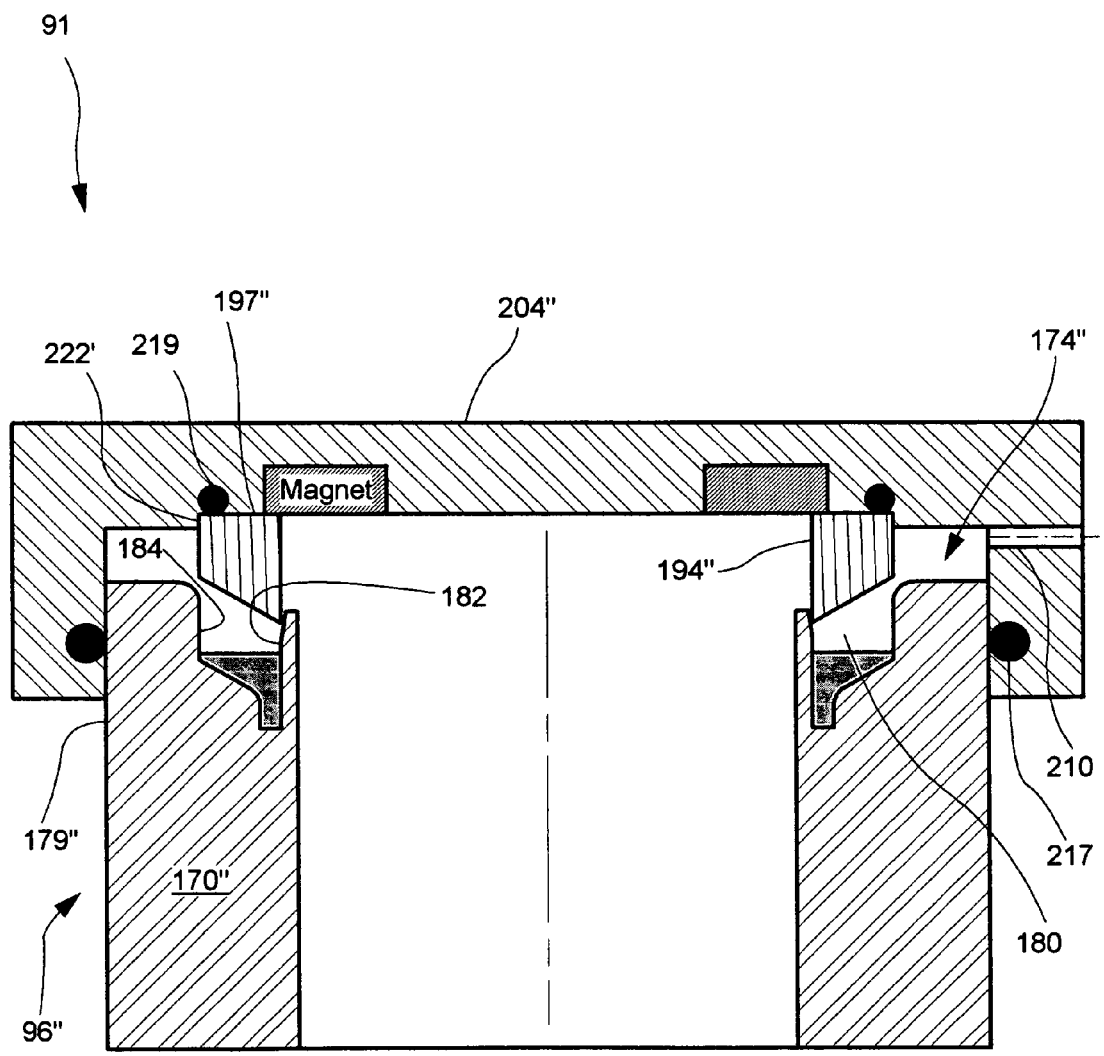
FIG. 11 schematically illustrates a cross-sectional view of an alternative valve seat assembly including a circular ring on a valve seat form and a circular top cap with magnetic ring restraint and a ring-cap seal.

Another embodiment of the present invention is schematically illustrated as valve seat assembly 91 in FIG. 11, In this embodiment the hermetic sealing function which permits evacuation of circular depression 180 and contiguous space is achieved by an interference fit between both the inner diameter and the outer diameter of circular ring 194" with inner depression wall 182 and outer depression wall 184 respectively. But circular ring 194" is only advanced into circular depression 180 to achieve such a hermetic seal after a vacuum is established around the powder within circular depression 180 and contiguous space. This vacuum is achieved by evacuating, through evacuation/pressurization port 210, the space bounded by portions of circular top cap 204", circular ring 194" (which is sealed in its contact with top cap 204" by seal 219) and valve seat form 96". Note that the sealing function of the interference fit between the inner diameter of circular ring 194" and inner depression wall 182 after partial advancement of circular ring 194" into circular depression 180 allows evacuation of circular depression 180 and contiguous space before contact is made between the outer diameter of circular ring 194" and outer depression wall 184. After the desired level of vacuum within circular depression 180 and contiguous space is achieved (i.e., less than 0.1 torr), circular ring 194" may be further advanced into circular depression 180 (by pressure exerted on reverse face 197" of circular ring 194" by circular top cap 204") to redistribute and compress metallic powder within circular depression 180 as described above to form a P/M preform. Because of the hermetic seal then existing due to the interference fit of circular ring 194" within circular depression 180, circular top cap 204" may be removed prior to application of HIP. This removal may be facilitated by pressurizing (e.g., by compressed air admitted via evacuation/pressurization port 210) the space bounded by portions of circular top cap 204", circular ring 194" and valve seat form 96".

Note that circular top cap 204" in FIG. 11 extends across the entire first end of valve seat form 96", as does circular top cap 204' in FIG. 10. Circular top cap 204' comprises a shallow counterbore 222, and circular top cap 204" comprises a shallow counterbore 222'. Both counterbore 222 and counterbore 222' are centered within their respective circular top caps and are dimensioned to fit slidingly and sealingly over circular ring 194". Counterbore 222' has at least one inner circumferential seal 219 for sealing against circular ring 194" as circular ring 194" is fitted slidingly within counterbore 222'. Circumferential seal 219 functions with the interference fit between the inner diameter of circular ring 194" and inner depression wall 182 (when the outer diameter of circular ring 194" has not yet contacted outer depression wall 184) to facilitate evacuation of circular depression 180 and contiguous space without the need for valve seat plug 208 as shown in FIG. 10. Circular top cap 204' and circular top cap 204" each, of course, have at least one circumferential seal 217 for sealing the respective circular top cap against circular wall outer surface 179" as the circular top cap is fitted slidingly over circular wall first end 174" of valve seat form 96".

Figure 12A:
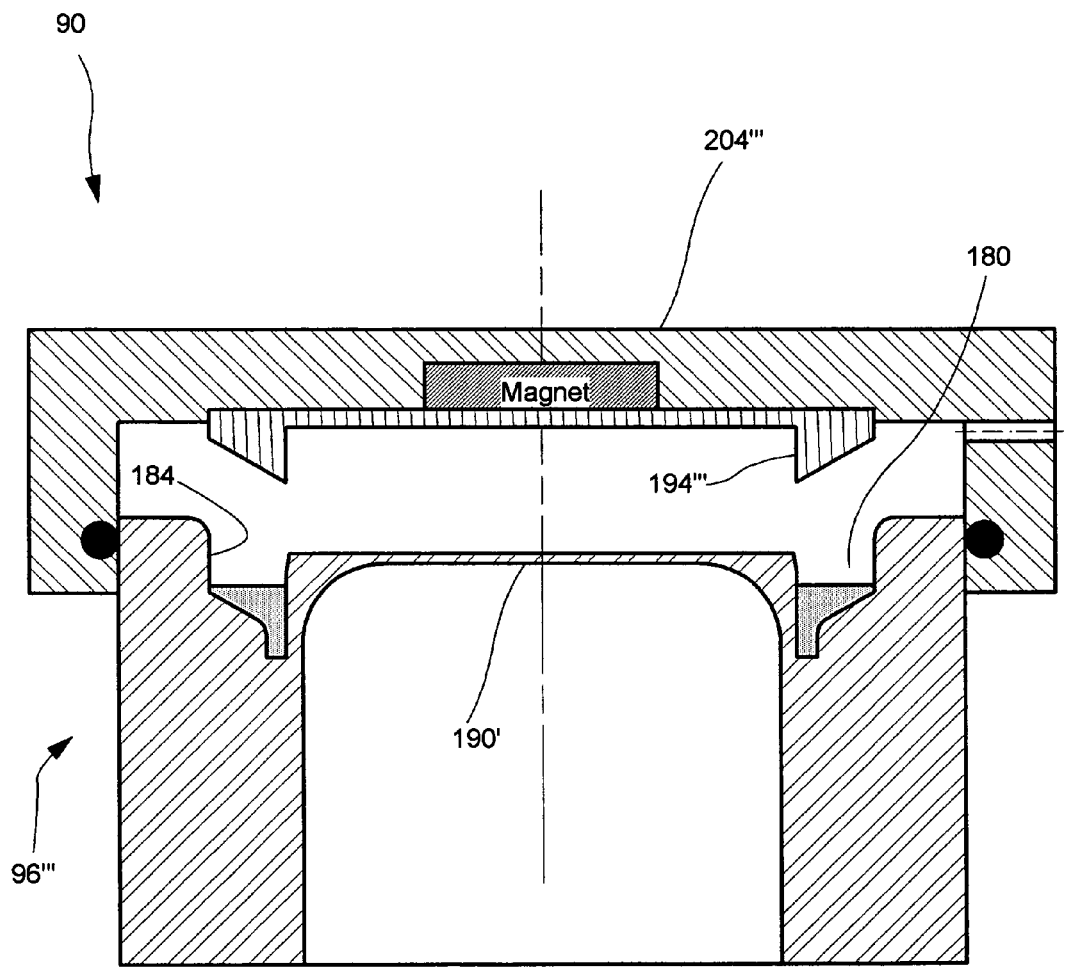
FIG. 12A schematically illustrates a cross-sectional view of an alternative valve seat assembly including a circular lid-ring on a valve seat form with a transverse web and a circular top cap having an evacuation/pressurization port and magnetic ring restraint in a shallow counterbore.
Figure 12B:
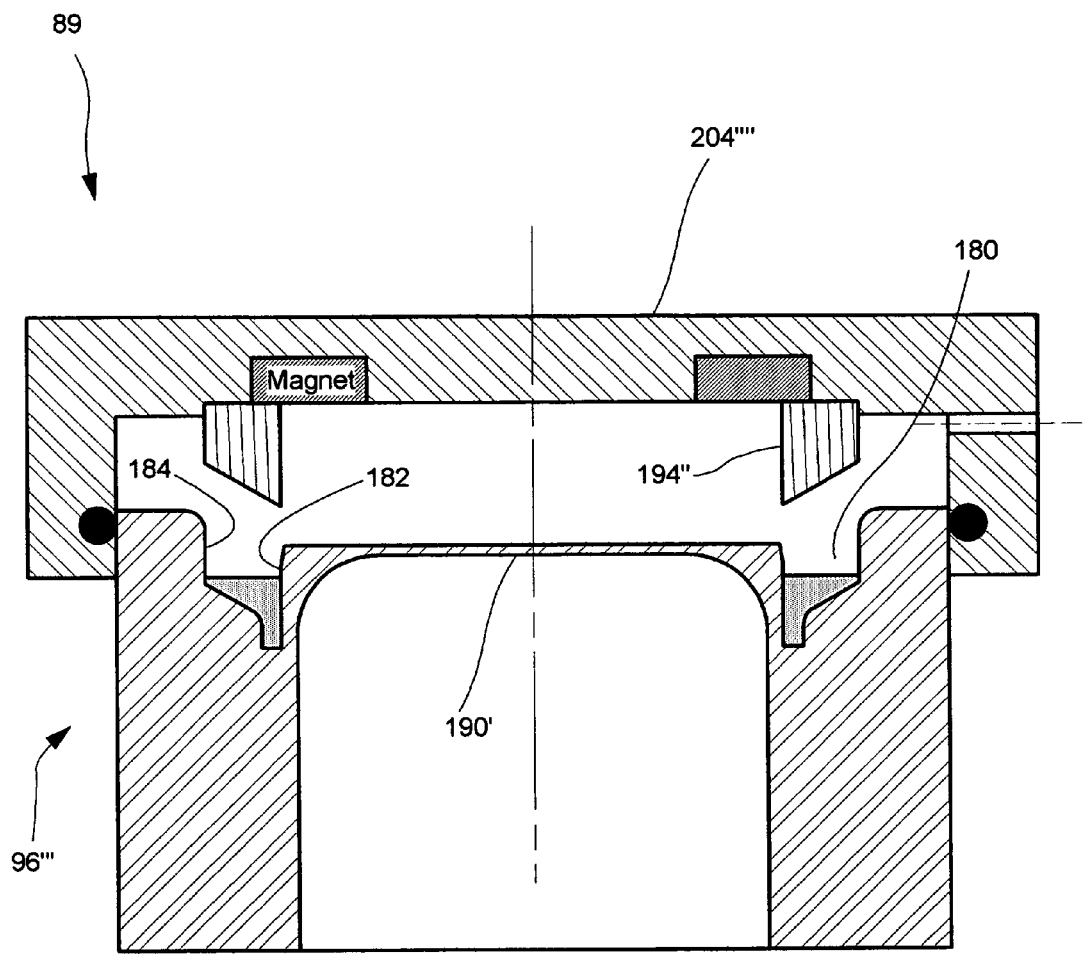
FIG. 12B schematically illustrates a cross-sectional view of an alternative valve seat assembly including a circular ring on a valve seat form with a transverse web and a circular top cap having an evacuation/pressurization port with magnetic ring restraint in a shallow counterbore.

The embodiment of the present invention schematically illustrated as valve seat assembly 90 in FIG. 12A and valve seat assembly 89 in FIG. 12B each comprise a valve seat form 96''' having a transverse web 190'. Both circular top cap 204''' (in FIG. 12A) and circular top cap 204'''' (in FIG. 12B) extend entirely across valve seat form 96'''. In the use of valve seat assemblies 90 and 89, insertion and removal of a valve seat plug, as with valve seat assembly 92, is made unnecessary by the presence of transverse web 190' (which is removed, for example, during finish machining after formation of a HIPPED valve seat inlay).

Note that circular lid-ring 194''' in valve seat assembly 90 and circular ring 194" in valve seat assembly 89 both function to provide hermetic sealing of circular depression 180. But circular lid-ring 194''' is hermetically sealed within circular depression 180 by an interference fit of only its outer diameter with outer depression wall 184. While in contrast, circular ring 194" is hermetically sealed within circular depression 180 by an interference fit of both its inner and outer diameters with inner depression wall 182 and outer depression wall 184 respectively.

The circular top caps 204''' and 204'''' in valve seat assemblies 90 and 89 respectively (see FIGS. 12A and 12B) are used generally as described above for circular top cap 204' in valve seat assembly 92 (see FIG. 10) to establish the required vacuum within circular depression 180 and contiguous space prior to hermetic sealing as described above. Following establishment of the required vacuum in the embodiment of valve seat assembly 90, circular lid-ring 194''' is moved by pressure applied via circular top cap 204''' into circular depression 180 to redistribute metallic powder previously placed there to form a P/M preform, simultaneously creating a hermetic seal which maintains the P/M preform in a high vacuum. Analogously, in the embodiment of valve seat assembly 89 establishment of the required vacuum in circular depression 180 and contiguous space is followed by movement of circular lid-ring 194" into circular depression 180 by pressure applied via circular top cap 204"". After these operations, circular top caps 204'" and 204"" are removed from their respective valve seat assemblies using, for example, compressed air as described above. Following removal of circular top caps 204'" and 204"", the assemblies containing the respective P/M performs may be HIPPED.

Note the use of magnets in FIGS. 9A, 9B, 10, 11, 12A and 12B as ring retention means for temporarily retaining a circular ring or circular lid-ring within a circular top cap as the top cap is fitted slidingly and sealingly over a circular wall first end. Note also the use of shallow counterbores in FIGS. 9A, 9B, 10, 11, 12A and 12B as ring centering means for centering a circular ring retained by ring retention means in a circular top cap. Being so centered, a circular ring or circular lid-ring will be positioned for advancement into circular depression 180 as described above.

Figure 13:
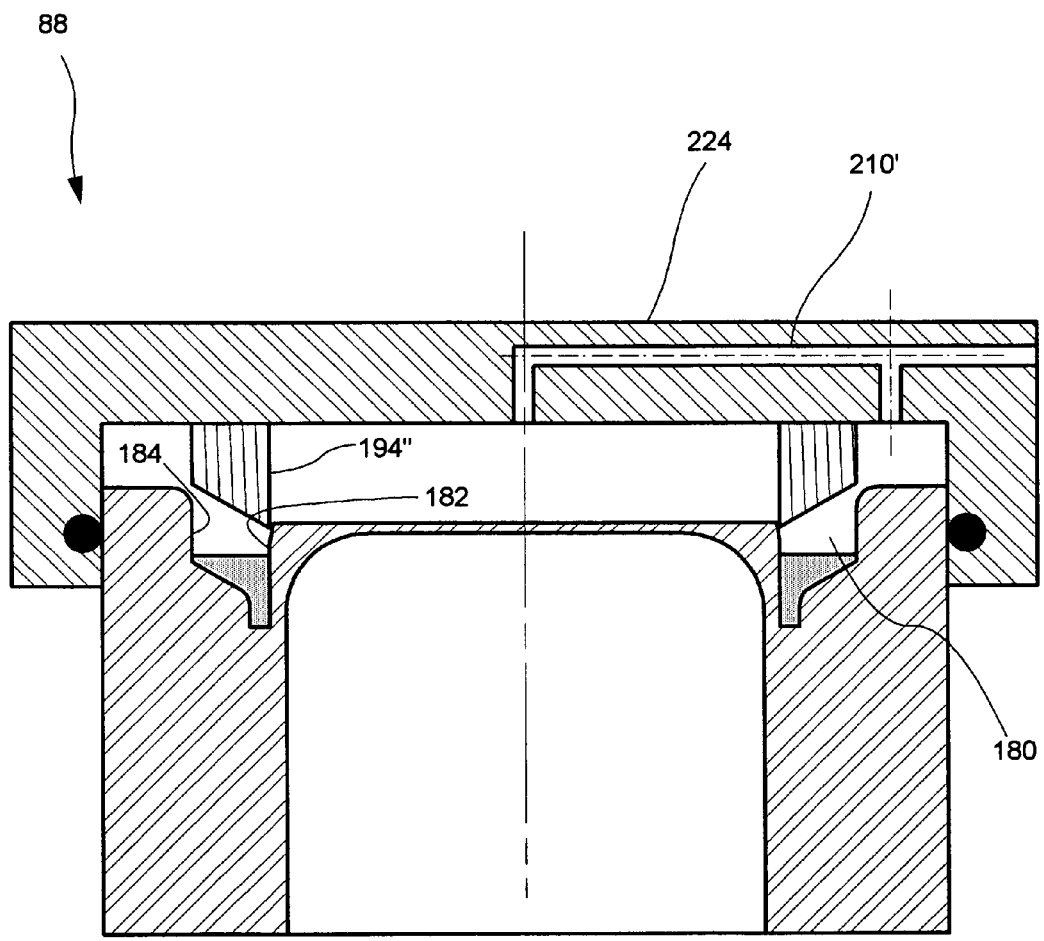
FIG. 13 schematically illustrates a cross-sectional view of an alternative valve seat assembly including a circular ring on a valve seat form with a transverse web and a circular top cap having a dual-passage evacuation/pressurization port without magnetic ring restraint or a shallow counterbore.

An embodiment of the present invention which does not involve the centering function of a shallow counterbore as noted above is schematically illustrated in FIG. 13. A cross-sectional view in FIG. 13 shows an alternative valve seat assembly 88 having a circular top cap 224 that may be compared with circular top cap 204"" in valve seat assembly 89 in FIG. 12B. Valve seat assembly 89 includes a circular top cap 204"" having an evacuation/pressurization port 210 with single-passage access to space enclosed by portions of top cap 204"", plus magnetic ring restraint and a shallow counterbore 222 for centering the circular ring. But circular top cap 224 has an evacuation/pressurization port 210' with dual-passage access to space enclosed by portions of circular top cap 224, without magnetic ring restraint or a shallow counterbore. This dual-passage access to space within circular top cap 224 allows relatively faster evacuation of circular depression 180 and contiguous space in the embodiment of FIG. 13 than is possible with a single-passage access such as that schematically shown in assembly 89 (see FIG. 12B).

Note that prior to evacuation of circular depression 180 and contiguous space in the embodiment of FIG. 13, circular ring 194" would be advanced far enough into circular depression 180 to center circular ring 194" through contact of its inner diameter with inner depression wall 182. But circular ring 194" would not be advanced far enough into circular depression 180 to achieve a hermetic seal through an interference fit with both inner depression wall 182 and outer depression wall 184. Without this hermetic seal, evacuation of the space in which metallic powder rests within circular depression 180 (and contiguous space) is possible. Following such evacuation, circular ring 194" is advanced far enough into circular depression 180 to redistribute and compress the metallic powder while simultaneously completing the hermetic seal. This hermetic seal then maintains the metallic powder under vacuum while top cap 224 is removed and during the subsequent application of HIP.

What is claimed is:

1. A valve seat form comprising
    a circular wall around a cylindrical void, said circular wall being substantially symmetrical about a longitudinal axis and having a first end spaced apart from a second end, as well as an inner surface spaced apart from an outer surface;
    a circular depression in said circular wall first end between said circular wall inner and outer surfaces, said circular depression comprising cylindrical inner and outer depression walls coaxial with said circular wall, said inner and outer depression walls being spaced apart from each other and extending from said circular wall first end toward said circular wall second end to a depression bottom surface, said depression bottom surface extending between said inner depression wall and said outer depression wall; and
    a transverse web extending from said circular wall inner surface completely across said cylindrical void adjacent to said circular wall first end, peripheral portions of said transverse web being integral with said circular wall inner surface.

2. The valve seat form of claim 1 additionally comprising a peripheral circular rim on said circular wall first end, said circular rim being usable for centering and peripherally hermetically sealing a deformable circular lid extending over said circular depression and said transverse web.

3. The valve seat form of claim 2, wherein said transverse web comprises a shallow concavity substantially symmetrical about said longitudinal axis and extending toward said circular wall second end.

4. The valve seat form of claim 3 wherein said circular wall comprises H13 tool steel.

5. The valve seat form of claim 1, wherein said depression bottom surface comprises at least one circular sloping surface, one said circular sloping surface being substantially symmetrical about said longitudinal axis and sloping generally from said outer depression wall toward said inner depression wall and simultaneously toward said circular wall second end.

6. The valve seat form of claim 5, wherein said depression bottom surface additionally comprises at least one circular flat surface, each said circular flat surface being substantially symmetrical about said longitudinal axis.

7. The valve seat form of claim 5 wherein at least one said circular sloping surface comprises a conical surface symmetrical about said longitudinal axis, at least one said conical surface being sloped at an angle between about 20 degrees and about 60 degrees with respect to said longitudinal axis.

8. The valve seat form of claim 5 wherein said depression bottom surface additionally comprises a smoothly curved transition surface between one said circular sloping surface and said inner depression wall.

9. A valve seat assembly comprising the valve seat form of claim 2 and additionally comprising:
    a circular ring sealingly movable longitudinally within said circular depression, said circular ring having an obverse face for redistributing and compressing metallic powder within said circular depression and a reverse face;
    metallic powder located within said circular depression between said circular ring obverse face and said depression bottom surface, said metallic powder being redistributable and compressible by longitudinal movement of said circular ring within said circular depression toward said depression bottom surface; and
    a deformable circular lid centerable within said peripheral circular rim on said circular wall first end, said deformable circular lid extending over said circular depression and said transverse web, and said deformable circular lid being peripherally hermetically sealable to said peripheral circular rim.

10. The valve seat assembly of claim 9 wherein and said circular ring is dimensioned to create an interference fit between said circular ring and said inner depression wall.

11. The valve seat assembly of claim 9 wherein said transverse web comprises a shallow concavity substantially symmetrical about said longitudinal axis and extending toward said circular wall second end.

12. The valve seat assembly of claim 11 wherein said deformable circular lid and said circular ring are formed as a single circular lid-ring structure, said circular lid-ring being peripherally hermetically sealable to said peripheral circular rim, and said circular lid-ring being deformable to allow longitudinal movement toward said depression bottom surface for redistribution and compression of said metallic powder within said circular depression.

13. A valve seat assembly comprising the valve seat form of claim 1 and additionally comprising:
    a circular ring sealingly movable longitudinally within said circular depression, said circular ring having an obverse face for redistributing and compressing metallic powder within said circular depression and a reverse face, said circular ring being dimensioned to create an interference fit between said circular ring and said inner depression wall, and said circular ring being hermetically sealable to said circular wall first end; and
    metallic powder located within said circular depression between said circular ring obverse face and said depression bottom surface, said metallic powder being redistributable and compressible by longitudinal movement of said circular ring within said circular depression toward said depression bottom surface.

14. A method of forming a tempered valve seat inlay, the method comprising:
    providing the valve seat assembly of claim 11;
    redistributing and compressing said metallic powder by longitudinal movement of said circular ring within said circular depression toward said depression bottom surface to form a metallic powder preform assembly;
    inserting said metallic powder preform assembly in a vacuum chamber;
    evacuating said vacuum chamber to about 0.1 torr;
    peripherally hermetically sealing said deformable circular lid to said peripheral circular rim using electron-beam welding to form an evacuated valve seat assembly;
    increasing ambient pressure on said evacuated valve seat assembly to atmospheric pressure;
    testing said evacuated valve seat assembly for a shallow concavity in said deformable circular lid, said shallow concavity being substantially symmetrical about said longitudinal axis and extending toward said circular wall second end;
    heating said evacuated valve seat assembly sufficiently to make said metallic powder plastic, thus forming a heated evacuated valve seat assembly;
    applying an ambient pressure of about 15,000 pounds per square inch to said heated evacuated valve seat assembly to form a consolidated valve seat inlay assembly;
    annealing said consolidated valve seat inlay assembly to form an annealed valve seat inlay assembly;
    finish machining said annealed valve seat inlay assembly to form a finish-machined valve seat inlay;
    heating said finish-machined valve seat inlay to about 1900 degrees F. to form a heated valve seat inlay;
    hardening said heated valve seat inlay by gas-quenching to form a hardened valve seat inlay; and
    tempering said hardened valve seat inlay to form a tempered valve seat inlay.

15. A valve seat on which a hardened valve seat inlay is formed according to the method of claim 14.

16. A method of forming a tempered valve seat inlay, the method comprising:
    providing the valve seat assembly of claim 12;
    redistributing and compressing said metallic powder by longitudinal movement of said lid-ring structure toward said depression bottom surface to form a metallic powder preform assembly;
    inserting said metallic powder preform assembly in a vacuum chamber;
    evacuating said vacuum chamber to about 0.1 torr;
    peripherally hermetically sealing said deformable circular lid-ring to said peripheral circular rim using electron-beam welding to form an evacuated valve seat assembly;
    increasing ambient pressure on said evacuated valve seat assembly to atmospheric pressure;
    testing said evacuated valve seat assembly for a shallow concavity in said deformable circular lid-ring, said shallow concavity being substantially symmetrical about said longitudinal axis and extending toward said circular wall second end;
    heating said evacuated valve seat assembly sufficiently to make said metallic powder plastic, thus forming a heated evacuated valve seat assembly;
    applying an ambient pressure of about 15,000 pounds per square inch to said heated evacuated valve seat assembly to form a consolidated valve seat inlay assembly;
    annealing said consolidated valve seat inlay assembly to form an annealed valve seat inlay assembly;
    finish machining said annealed valve seat inlay assembly to form a finish-machined valve seat inlay;
    heating said finish-machined valve seat inlay to about 1900 degrees F. to form a heated valve seat inlay;
    hardening said heated valve seat inlay by gas-quenching to form a hardened valve seat inlay; and
    tempering said hardened valve seat inlay to form a tempered valve seat inlay.

17. A valve seat on which a hardened valve seat inlay is formed according to the method of claim 16.

18. A method of forming a tempered valve seat inlay, the method comprising:
    providing the valve seat assembly of claim 13;
    redistributing and compressing said metallic powder by longitudinal movement of said circular ring within said circular depression toward said depression bottom surface to form a metallic powder preform assembly;
    inserting said metallic powder preform assembly in a vacuum chamber;
    evacuating said vacuum chamber to about 0.1 torr;
    hermetically sealing said circular ring to said circular wall first end using electron-beam welding to form an evacuated valve seat assembly;
    heating said evacuated valve seat assembly sufficiently to make said metallic powder plastic, thus forming a heated evacuated valve seat assembly;
    applying an ambient pressure of about 15,000 pounds per square inch to said heated evacuated valve seat assembly to form a consolidated valve seat inlay assembly;
    annealing said consolidated valve seat inlay assembly to form an annealed valve seat inlay assembly;
    finish machining said annealed valve seat inlay assembly to form a finish-machined valve seat inlay;
    heating said finish-machined valve seat inlay to about 1900 degrees F. to form a heated valve seat inlay;
    hardening said heated valve seat inlay by gas-quenching to form a hardened valve seat inlay; and
    tempering said hardened valve seat inlay to form a tempered valve seat inlay.

19. A valve seat on which a hardened inlay is formed according to the method of claim 18.

20. A valve seat form comprising
  a circular wall around a cylindrical void, said circular wall being substantially symmetrical about a longitudinal axis and having a first end spaced apart from a second end, as well as an inner surface spaced apart from an outer surface; and
  a circular depression in said circular wall first end between said circular wall inner and outer surfaces, said circular depression comprising cylindrical inner and outer depression walls coaxial with said circular wall, said inner and outer depression walls being spaced apart from each other and extending from said circular wall first end toward said circular wall second end to a depression bottom surface, said depression bottom surface extending between said inner depression wall and said outer depression wall;
wherein said depression bottom surface comprises at least one circular sloping surface, one said circular sloping surface being substantially symmetrical about said longitudinal axis and sloping generally from said outer depression wall toward said inner depression wall and simultaneously toward said circular wall second end.

21. A valve seat assembly comprising the valve seat form of claim 20 and additionally comprising:
  a valve seat plug for insertion slidingly and sealingly within said circular wall cylindrical void from said circular wall second end, said valve seat plug comprising
    a flange for contacting said circular wall second end to limit insertion of said valve seat plug into said circular wall cylindrical void; and
    at least one circumferential seal for sealing said valve seat plug against said circular wall inner surface during sliding insertion of said valve seat plug within said circular wall cylindrical void;
  a circular ring sealingly movable longitudinally within said circular depression, said circular ring having an obverse face for redistributing and compressing metallic powder within said circular depression and a reverse face, and said circular ring being dimensioned to create an interference fit of said circular ring between said inner and outer depression walls;
  metallic powder located within said circular depression between said circular ring obverse face and said depression bottom surface, said metallic powder being redistributable and compressible by longitudinal movement of said circular ring within said circular depression toward said depression bottom surface; and
  a circular top cap fitting slidingly and sealingly over said circular wall first end and said circular ring, said circular top cap being movable longitudinally to contact said circular ring reverse face for moving said circular ring longitudinally within said circular depression toward said depression bottom surface, said circular top cap comprising
    at least one evacuation/pressurization port usable for evacuating space enclosed by said circular wall, said circular top cap, and said valve seat plug; and
    at least one internal circumferential seal for sealing said circular top cap against said circular wall outer surface as said circular top cap is fitted slidingly over said circular wall first end.

22. A valve seat assembly comprising the valve seat form of claim 20 and additionally comprising:
  a circular ring sealingly movable longitudinally within said circular depression, said circular ring having an obverse face for redistributing and compressing metallic powder within said circular depression and a reverse face, and said circular ring being dimensioned to create an interference fit of said circular ring between said inner and outer depression walls;
  metallic powder located within said circular depression between said circular ring obverse face and said depression bottom surface, said metallic powder being redistributable and compressible by longitudinal movement of said circular ring within said circular depression toward said depression bottom surface; and
  a circular top cap fitting slidingly and sealingly over said circular wall first end and said circular ring, said circular top cap being movable longitudinally to contact said circular ring reverse face for moving said circular ring longitudinally within said circular depression toward said depression bottom surface, said circular top cap comprising
    at least one evacuation/pressurization port usable for evacuating space enclosed by said circular wall, said circular top cap, and said circular ring;
    at least one internal circumferential seal for sealing said circular top cap against said circular wall outer surface as said circular top cap is fitted slidingly over said circular wall first end; and
    a shallow counterbore centered within said circular top cap, said shallow counterbore being dimensioned to fit slidingly and sealingly over said circular ring, and said shallow counterbore having at least one circular seal for sealing against said circular ring as said circular ring is fitted slidingly within said shallow counterbore.

23. A valve seat assembly comprising the valve seat form of claim 1 and additionally comprising:
  a circular ring sealingly movable longitudinally within said circular depression, said circular ring having an obverse face for redistributing and compressing metallic powder within said circular depression and a reverse face, said circular ring being dimensioned to create an interference fit of said circular ring between said inner and outer depression walls;
  metallic powder located within said circular depression between said circular ring obverse face and said depression bottom surface, said metallic powder being redistributable and compressible by longitudinal movement of said circular ring within said circular depression toward said depression bottom surface; and
  a circular top cap fitting slidingly and sealingly over said circular wall first end and said circular ring, said circular top cap being movable longitudinally to contact said circular ring reverse face for moving said circular ring longitudinally within said circular depression toward said depression bottom surface, said top cap comprising
    at least one evacuation/pressurization port usable for evacuating space enclosed by said circular wall, said circular top cap, and said transverse web; and
    at least one internal circumferential seal for sealing said circular top cap against said circular wall outer surface as said circular top cap is fitted slidingly over said circular wall first end.

24. The valve seat assembly of claim 23 additionally comprising
  ring retention means for temporarily retaining said circular ring within said circular top cap; and
  ring centering means for centering said circular ring within said circular top cap.

* * * * *